(12) United States Patent
Bowers et al.

(10) Patent No.: US 6,183,636 B1
(45) Date of Patent: Feb. 6, 2001

(54) FILTER ASSEMBLY MOUNTED IN SINK COUNTER TOP

(75) Inventors: David L. Bowers, Boca Raton, FL (US); Troy Livingston; Steve Park, both of Wheeling, IL (US)

(73) Assignee: Pure Water, Inc., Chicago, IL (US)

( * ) Notice: Under 35 U.S.C. 154(b), the term of this patent shall be extended for 0 days.

(21) Appl. No.: 09/418,267

(22) Filed: Oct. 14, 1999

Related U.S. Application Data

(62) Division of application No. 08/774,735, filed on Jan. 2, 1997, now Pat. No. 5,983,938.

(51) Int. Cl.⁷ .......................... B01D 27/02; B01D 35/02
(52) U.S. Cl. ..................... 210/232; 210/282; 210/420; 210/444; 210/455
(58) Field of Search ........................... 210/282, 232, 210/416.3, 455, 443, 444, 451, 459, 460, 463, 473, 474, 477, 420, 435

(56) References Cited

U.S. PATENT DOCUMENTS

| | | |
|---|---|---|
| 585,674 | 7/1897 | Jones . |
| 995,368 | 6/1911 | Pleins . |
| 1,232,822 | 7/1917 | Schoonover . |
| 1,434,945 | 11/1922 | Cooper . |
| 1,559,706 | 11/1925 | Jennings . |
| 1,714,825 * | 5/1929 | Stephan ............................ 210/466 |
| 1,874,720 | 8/1932 | Wallace . |
| 2,049,530 | 8/1936 | Van Eweyk . |
| 3,088,755 | 5/1963 | Klamm . |
| 3,184,064 * | 5/1965 | Sampson et al. ..................... 210/136 |
| 3,227,175 | 1/1966 | Remington et al. . |
| 3,612,279 | 10/1971 | Hostetter . |
| 3,620,241 | 11/1971 | Brown . |
| 3,647,083 | 3/1972 | Niccum et al. . |
| 3,675,776 * | 7/1972 | Campo ............................... 210/282 |
| 3,789,991 | 2/1974 | Krongos . |
| 3,818,931 | 6/1974 | Carpenter . |
| 4,224,963 | 9/1980 | Stähle . |
| 4,635,673 | 1/1987 | Gerdes . |
| 4,653,538 | 3/1987 | Tsutsui et al. . |
| 4,686,037 | 8/1987 | Lang . |
| 4,713,175 | 12/1987 | Bray . |
| 4,771,485 | 9/1988 | Traylor . |
| 4,794,952 | 1/1989 | Buckard . |
| 4,825,908 | 5/1989 | Tsuchihashi et al. . |
| 4,960,139 | 10/1990 | Rizzetto . |
| 4,967,784 | 11/1990 | Barhydt, Sr. et al. . |
| 5,010,922 | 4/1991 | Agresta . |

(List continued on next page.)

Primary Examiner—Robert J. Popovics
(74) Attorney, Agent, or Firm—John W. Klooster

(57) ABSTRACT

A combination faucet assembly and filter assembly is provided wherein these respective assemblies are interconnected in a side-by-side relationship by pipes preferably located in a common housing structure. The combination is adapted for use in association with a kitchen sink or the like. The faucet assembly incorporates a valve for mixing hot and cold tap water and for diverting cold tap water for passage through a filter in the filter assembly. A spout is preferably associated with the faucet assembly. A pivotable faucet lever is preferably associated with the faucet assembly. The lever has a universal type of movement capability and is manipulated by an operator to accomplish regulating of either such mixing or such diverting, and also the regulating of water volume issuing from the spout. Preferably, in mixing hot and cold water in an operator selected ratio are fed to a mixing chamber adjacent the valve before dispensing of the resulting water mixture from a spout. Preferably, in diverting, the faucet lever is moved downward below the normal off position whereby cold water is diverted from the faucet assembly, passes through the filter, returns to the faucet assembly and exits through the spout. Preferably, the filter is in a cartridge form that is insertable into and removable from the filter assembly through the top thereof. Preferably the spout has one channel for mixed water and another channel for filtered water.

22 Claims, 14 Drawing Sheets

U.S. PATENT DOCUMENTS

| | | | |
|---|---|---|---|
| 5,061,367 | * 10/1991 | Hatch et al. | 210/282 |
| 5,082,568 | * 1/1992 | Holler | 210/688 |
| 5,118,418 | 6/1992 | Roussel . | |
| 5,126,041 | * 6/1992 | Weber et al. | 210/136 |
| 5,164,082 | 11/1992 | Lin . | |
| 5,167,819 | * 12/1992 | Iana et al. | 210/416.3 |
| 5,213,688 | 5/1993 | Robinson . | |
| 5,217,038 | 6/1993 | Pinder . | |
| 5,431,813 | * 7/1995 | Daniels | 210/282 |
| 5,510,031 | 4/1996 | Knauf, Jr. et al. . | |
| 5,545,322 | 8/1996 | Cheng . | |
| 5,601,710 | * 2/1997 | Yoon et al. | 210/455 |
| 5,685,981 | * 11/1997 | Koslow | 210/282 |
| 5,744,030 | * 4/1998 | Reid et al. | 210/282 |
| 5,753,107 | * 5/1998 | Manusson et al. | 210/282 |
| 5,753,118 | * 5/1998 | Yang | 210/282 |
| 5,795,471 | * 8/1998 | Naito | 210/282 |
| 5,983,938 | * 11/1999 | Bowers et al. | 210/282 |

\* cited by examiner

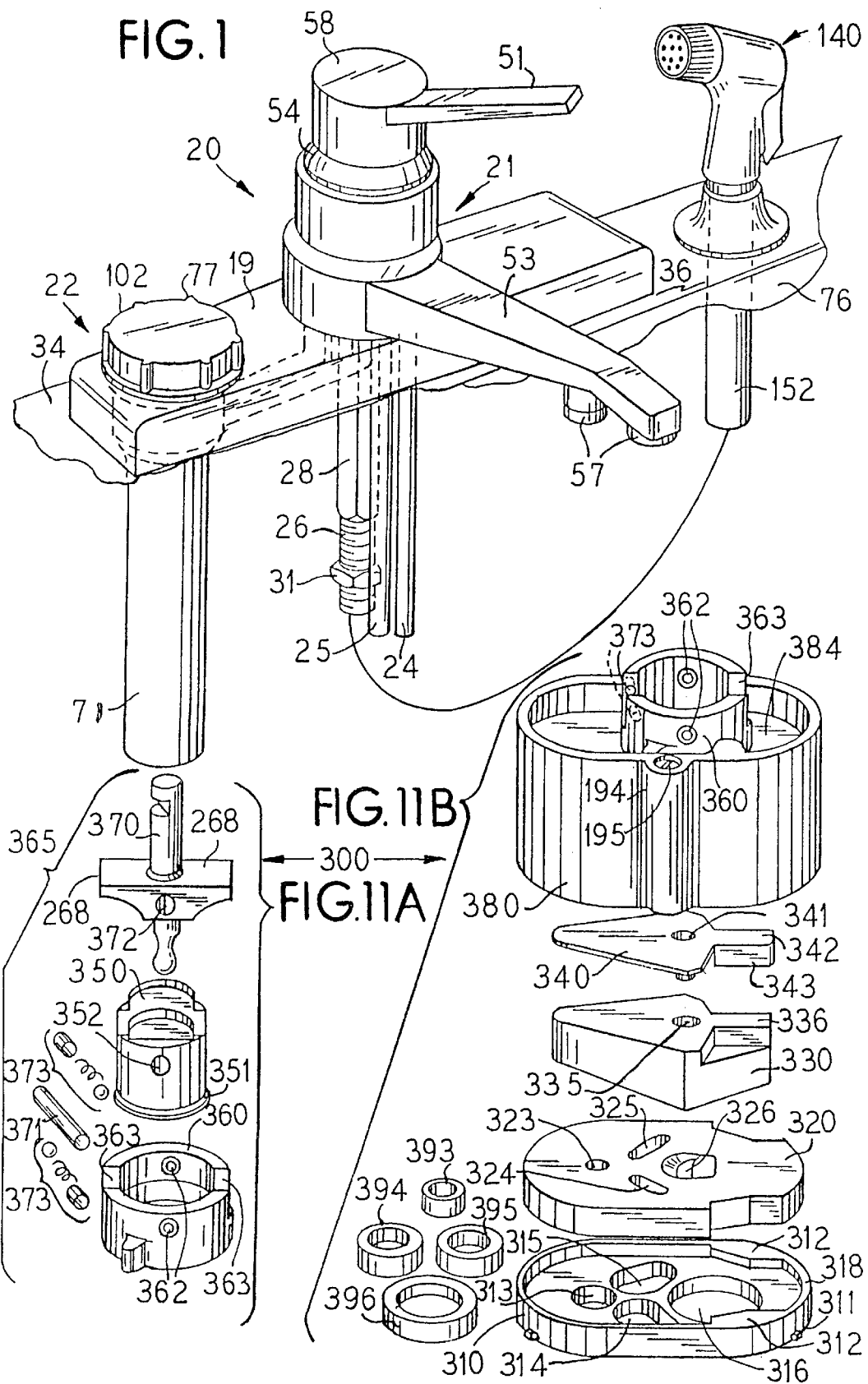

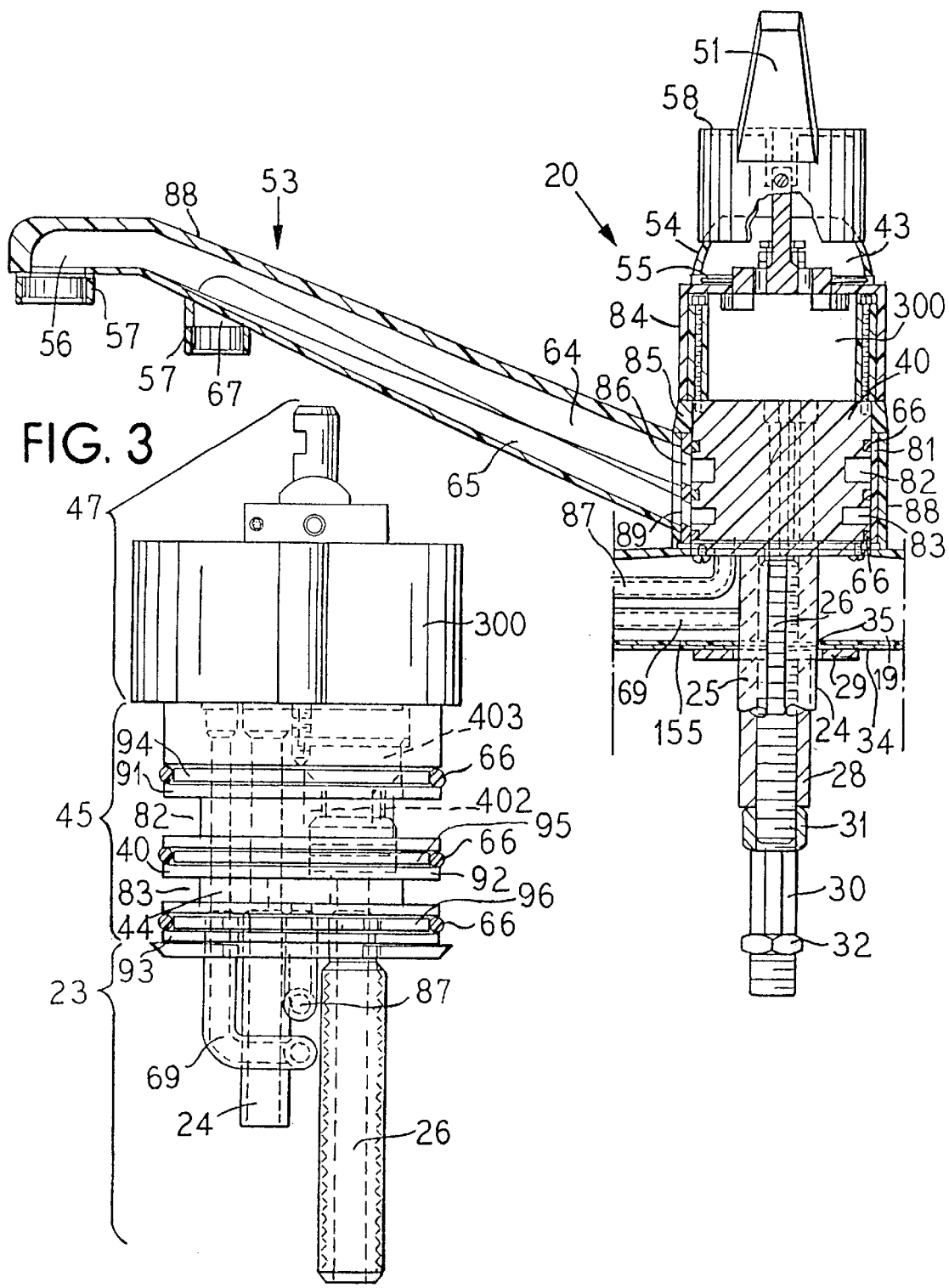

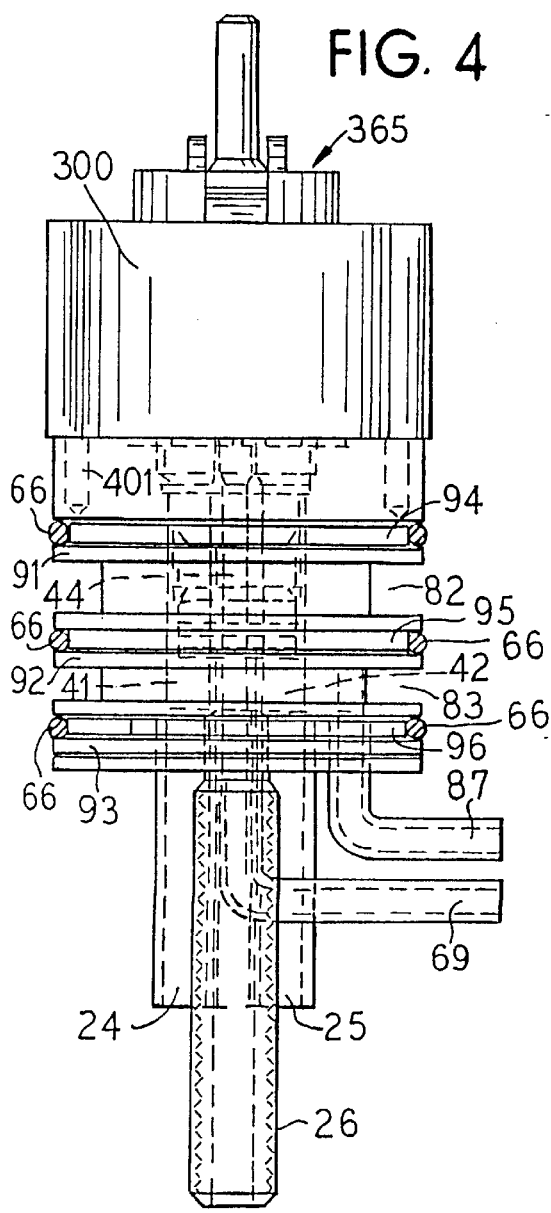
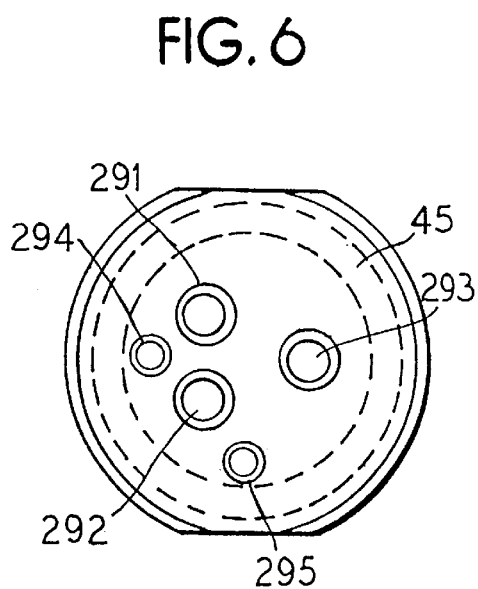
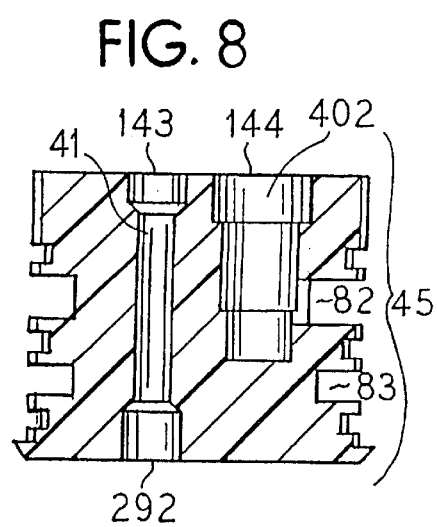
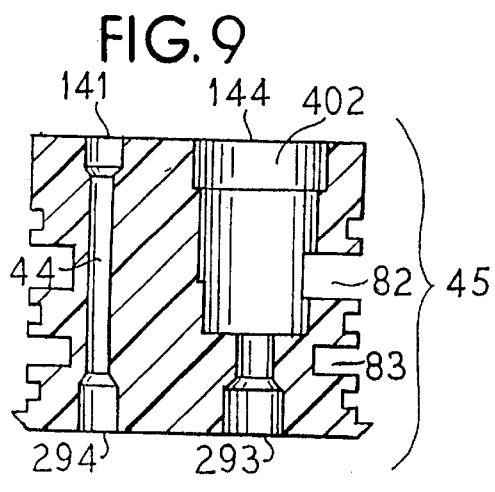
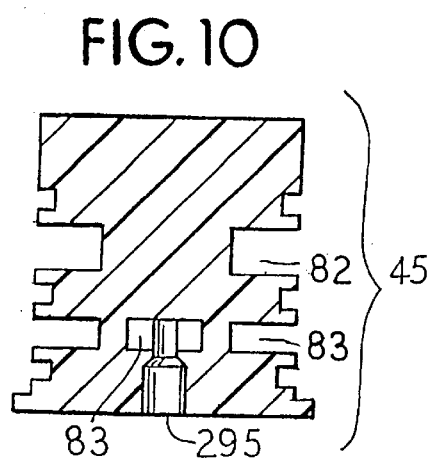

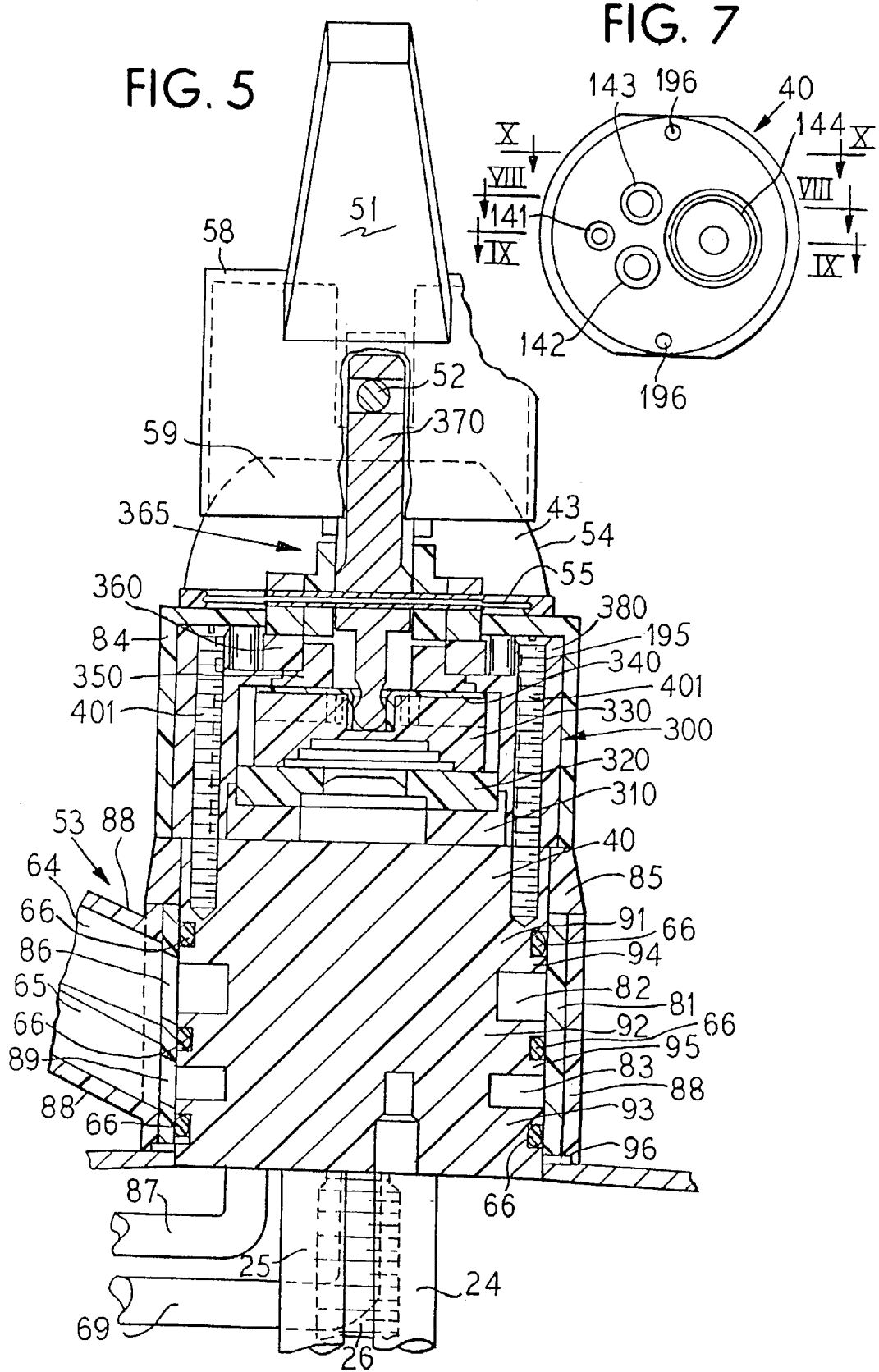

FIG. 16A
FIG. 16B
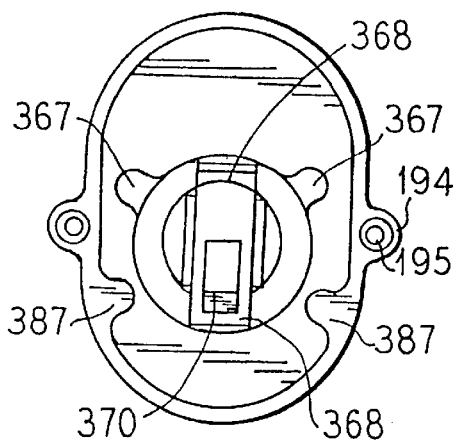
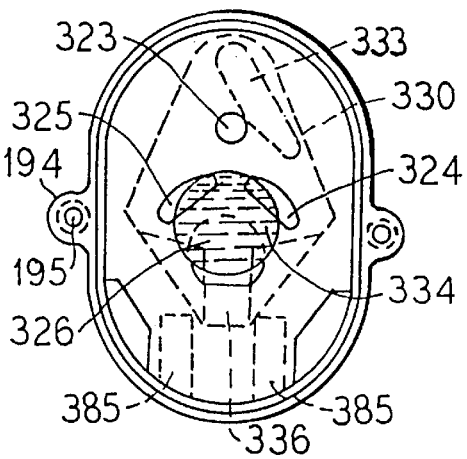
FIG. 17A
FIG. 17B
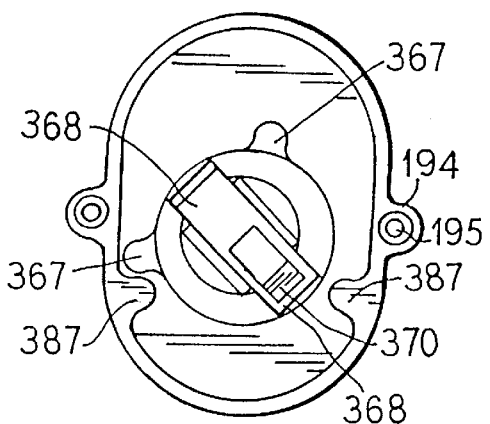
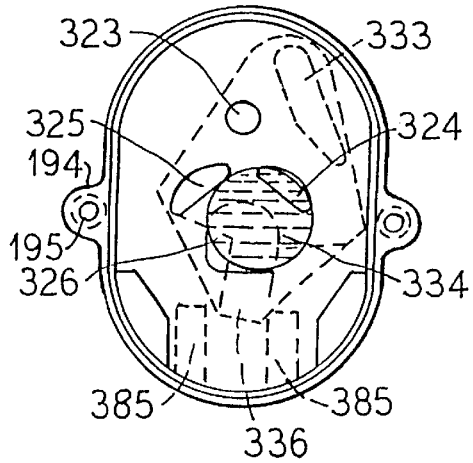
FIG. 18A
FIG. 18B
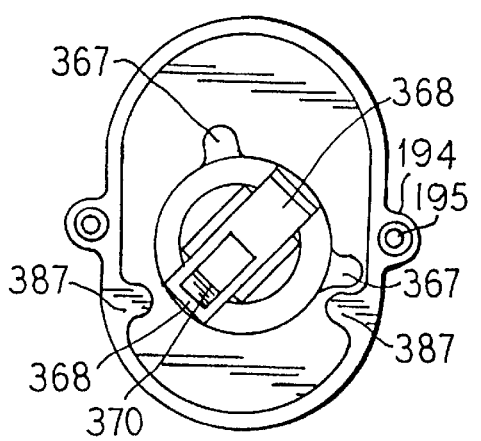
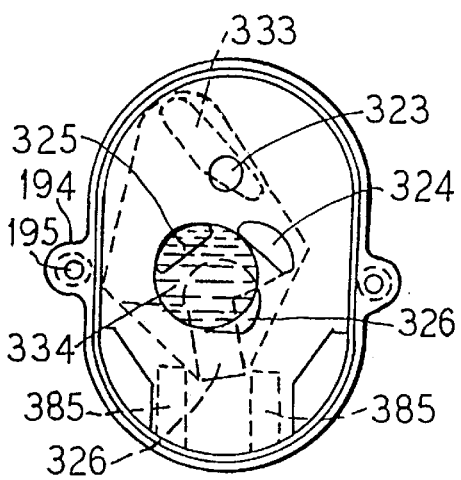

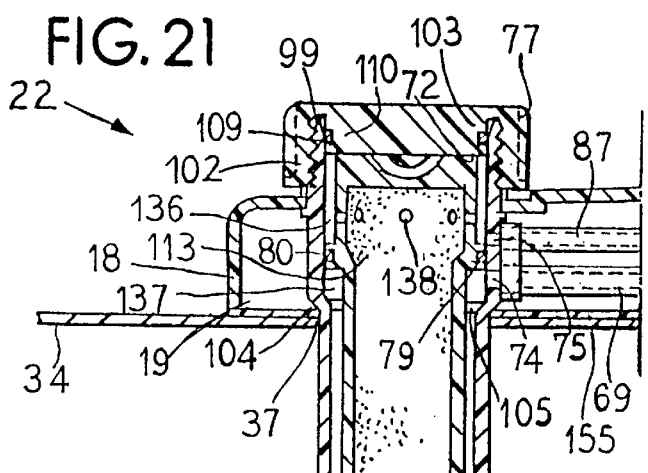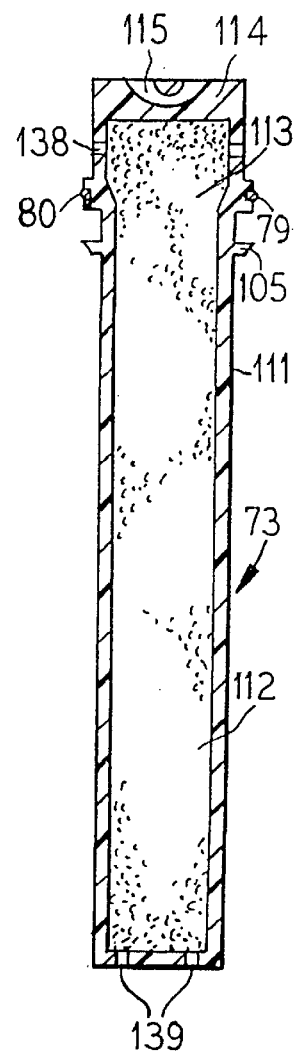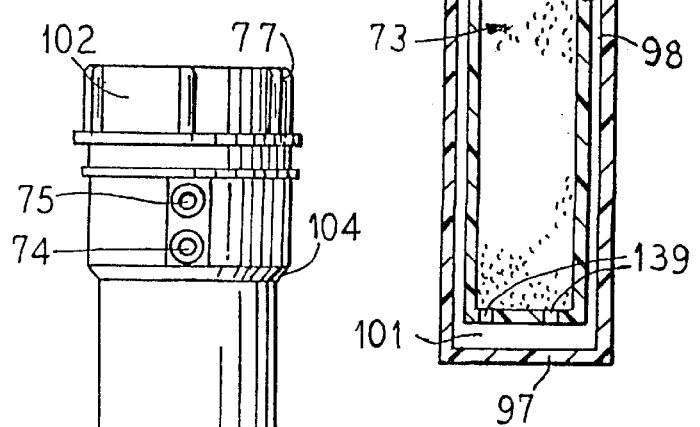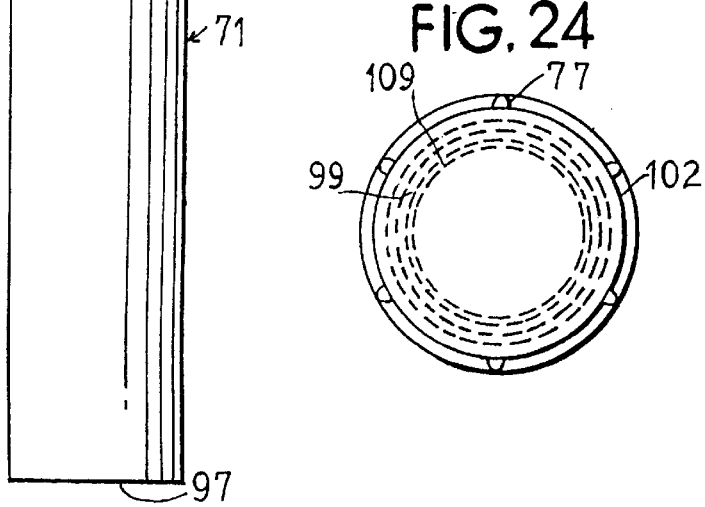

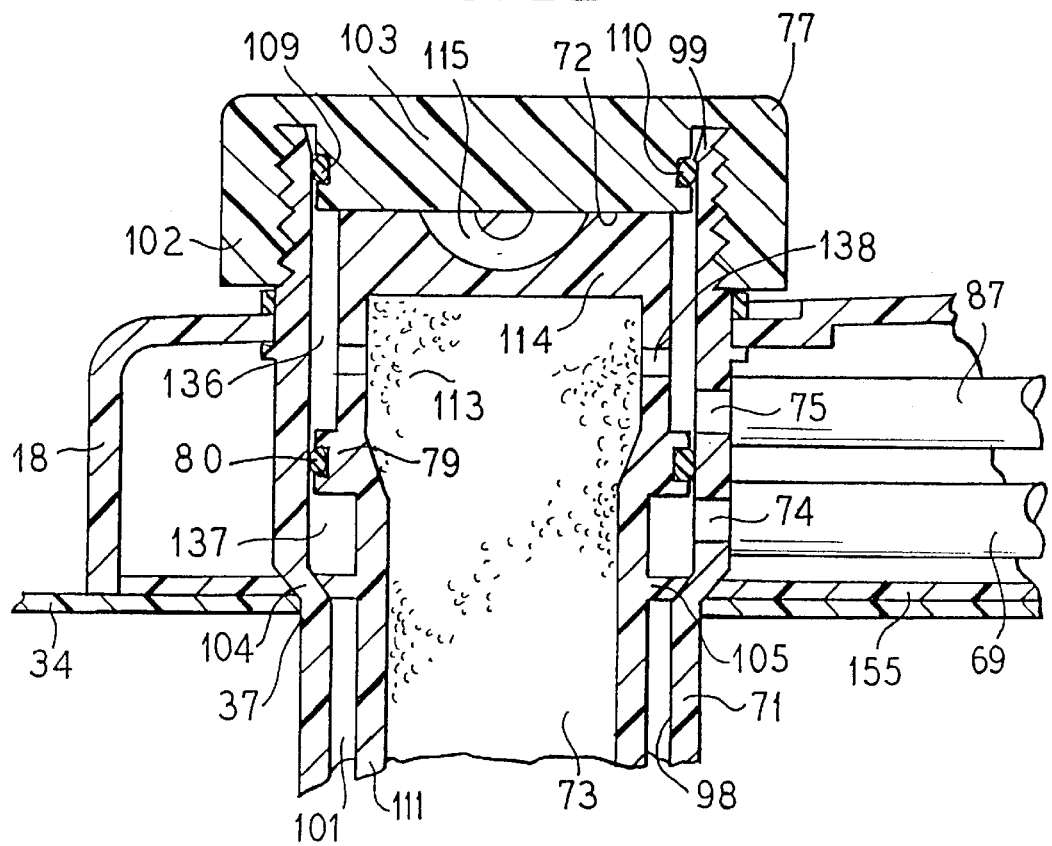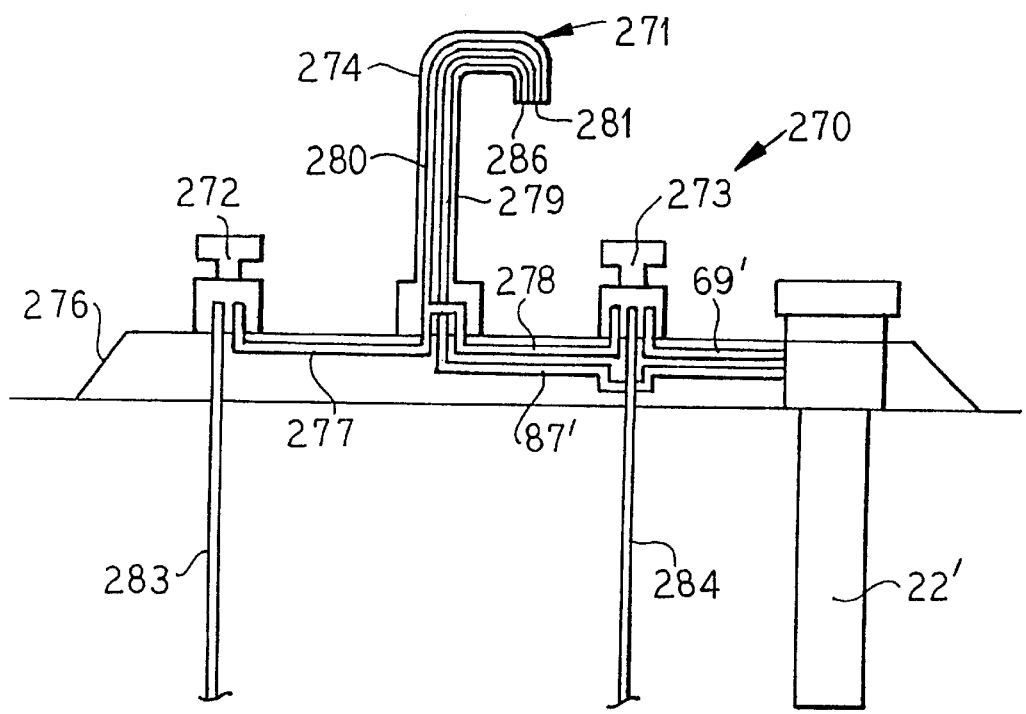

FILTER ASSEMBLY MOUNTED IN SINK COUNTER TOP

RELATED APPLICATION

This application is a division of U.S. Ser. No. 08/774,735 filed Jan. 2, 1997, now U.S. Pat. No. 5,983,938 issued Nov. 16. 1999.

FIELD OF THE INVENTION

This invention lies in the field of combined faucet and filter assemblies.

BACKGROUND OF THE INVENTION

Assemblies for filtering tap water wherein a water filter is arranged in the input pipe to a faucet are well known, as are arrangements where, for example, a faucet (a) is exteriorly connected to a filter, (b) incorporates a four-way valve including a filter by-pass, or (c) incorporates an on-off valve for a filter that is connected in the line for the cold water supply.

Prior art arrangements of faucets and filters appear to suffer from common disadvantages such as (a) they are relatively inconvenient to install, use and maintain, or (b) they require additional space (especially countertop space) beyond that required for a faucet alone, or (c) they interfere with the generally accepted appearance and function of a faucet structure. Also, special piping configurations and sink installation procedures are commonly required. Further, to replace a filter in such an arrangement, as is periodically necessary, it is typically required to use a cumbersome procedure that commonly involves tool usage, shutting off the line water, preliminarily somehow getting under or behind the associated sink, disassembly of various components, filter installation, component reassembly, etc. The difficulties, costs and problems that are associated with prior art arrangements of faucet and filters have tended to limit their sale, use and maintenance.

An added complication arises out of the circumstance that hot tap water and sometimes even warm tap water, cannot be subjected to filtration using conventional filter media without damaging such media and/or leaching out into the water being filtered components of the filter media, thereby injuring filtered water potability. Therefore, only cold tap water (that is, tap water from a cold tap water input line) should be employed for pre-drinking filtration.

In many regions, the quality of tap water continues to slowly deteriorate over time so that there is a progressively increasing need to filter tap water intended for human consumption. The art needs a new, useful and practical combination of faucet and filter that is simple to use, easy to install and maintain, and reliable.

The present invention fulfills this need and overcomes the above-indicated disadvantages.

SUMMARY OF THE INVENTION

In one aspect, the invention relates to a new and very useful functional and coacting interconnected combination of faucet assembly and filter assembly that is capable of dispensing either a mixture of cold and hot tap water or cold filtered tap water.

So far as now known, such a combination has not heretofore been known, particularly a combination where the same valve means that is used for adjustably mixing hot and cold tap water for dispensing through a spout means is also used to divert cold tap water for filtration before dispensing.

In another aspect, the invention relates to a new and very useful faucet assembly that is suitable for use in the combination or elsewhere. This faucet assembly incorporates valve means which functions in either one of two operating modes. In one operating mode, the valve means functions to deliver hot, cold or mixed hot and cold supplied tap water to an associated spout arm means. In a second operating mode, the valve means functions to divert only cold supplied tap water to an associated diverting conduit means. Preferably, the valve means is an integrated, composite valve structure which is actuated and controlled by a single faucet-associated valve regulator means whose position determines in the one operating mode water flow rate and temperature of the delivered tap water and whose position in the second operating mode determines cold filtered tap water flow rate. The associated spout arm means preferably incorporates two separate spout means, one for tap water and the other for diverted, processed (i.e., filtered) and returned water, each spout means being preferably located at or near the outer terminal portion of the spout arm means.

In another aspect, the invention relates to a new and very useful filter assembly that is suitable for use in the combination or elsewhere. The filter assembly incorporates a unitary filter housing structure having a removable cap means at one end thereof. When the cap means is removed, a filter cartridge is easily and simply installed in the housing structure. Various types of interchangeable filter cartridges can be employed in the filter housing, if desired, depending upon user preferences, use conditions, filter availability and like factors; however, a presently preferred filter cartridge structure is provided. The filter assembly includes input conduit means for connection thereof with the diverting conduit of a cooperating faucet assembly. The filter assembly is adapted to receive diverted cold water from the faucet assembly, to filter this water and to deliver the filtered water for dispensing. Preferably, the filter assembly is also associated with output conduit means adapted to deliver filtered water therefrom back to the faucet assembly for dispensing from the faucet assembly.

The filter assembly and the faucet assembly coact in the inventive combination and are preferably located in laterally adjacent relationship to one another. Preferably, the faucet assembly and the filter assembly in the combination are both associatable with a sink or basin back deck or the like. Preferably, the combination of the filter assembly and the faucet assembly includes a common housing structure and the whole combination is preferably locatable centrally on and/or in the back deck or the like of a sink, basin or the like. The common housing structure preferably functionally interconnects the filter assembly and the faucet assembly. Preferably, the common housing structure aids in associating the combination with a sink back deck or the like. Preferably, the common housing structure includes interconnecting conduit means that connect the filter assembly with the faucet assembly so that cold tap water that is diverted from the faucet assembly passes through the filter assembly and, preferably, is then delivered back to the faucet assembly. Preferably, filtered water delivered back to the faucet assembly exits through the faucet assembly's associated spout means. However, if desired, a separate dispensing spout, a separate faucet-type dispensing valve, or the like can be associated with the filter assembly so that filtered water can be discharged, if desired, from the vicinity of the filter assembly.

The combination including the faucet assembly, the filter assembly and the common housing structure is preferably configured and adapted for association with existing standardized apertures formed in a sink back deck, thereby permitting the combination to be used with a conventional kitchen or lavatory or other type of sink, thereby preferably avoiding or minimizing a need for alterations in an existing sink back deck or in the preformed apertures existing in a sink back deck.

The combination of faucet assembly and filter assembly provided by this invention is inventive and replaces and avoids any need for the cumbersome and problematic arrangements of faucets and filters that are common in the prior art.

The inventive combination of faucet assembly and filter assembly is versatile and adapted for use in a wide variety of sink-associated applications both where filtered and unfiltered tap water are needed or desired from sink-associated spout means, and also where various mixtures of hot and cold tap water are to be dispensed. Preferably both the admixed hot and cold tap water and the filtered cold tap water are dispensed from sink-associated spout arm means.

Various valve structures can be employed in the faucet assembly, as those skilled in the art will appreciate. Preferably, the presently provided new faucet assembly includes a faucet body means and an associated new valve structure which is capable of receiving hot and cold tap water from conventional respective supply lines. Preferably, the valve structure is in cartridge form. Also, preferably, the valve structure is capable of operating alternatively in either one of two different modes. In one mode of valve structure operation, user-selected and controlled predetermined amounts of hot water and/or cold water are admitted, admixed (if both hot and cold water are being admitted), and then delivered to an associated tap water spout means. In another mode of valve structure operation, user-selected and controlled predetermined amounts of cold water are passed in the faucet assembly to an associated diverting conduit which is adapted to deliver this water to a filter assembly (or other location).

After water filtration in the filter assembly, the resulting filtered water is optionally but preferably returned to the faucet assembly through another associated delivering conduit and is preferably passed to a filtered water spout means associated with the faucet assembly. A tap water spout means, if desired, can be separate from the filtered water spout means (preferred), or these respective spout means can be combined into a single spout means, if desired. If desired, the tap water spout means can be associated with a spout arm that is separate from the spout arm that is associated with the filtered water spout means.

Preferably, the valve structure employs two stacked, preferably ceramic disks. The disks each have respective defined perimeter and surface configurations and defined apertures. One of the disks is laterally slidably and controllably movable relative to the other in preset patterns to predetermined positions by an exterior user-actuated and controlled valve regulator means, such as an actuator arm, lever means or the like. The various relative positions achievable between the disks determine at any given time such variables as (a) whether or not hot tap water, cold tap water or a predetermined mixture thereof is admitted into, and passed through the valve structure for dispensing from spout means, and (b) whether or not cold tap water is diverted from the valve structure for passage to a filter assembly for filtering before dispensing from spout means.

Preferably, in the inventive combination of faucet assembly and filter assembly, the faucet assembly is provided with an elongated spout arm that is associated with the faucet body means and that is pivotable horizontally about a generally vertical axis when in the installed configuration at a sink. The spout arm includes duct means and terminal spout means. The spout arm can have various structures and configurations. Preferably, the spout arm houses a first duct means that longitudinally extends in the spout arm and that terminates at the spout arm outer or distal end in a tap water spout. This spout may be, if desired, terminally equipable with a conventional aerator. Preferably, and in addition, this spout arm also houses a second duct means that also longitudinally extends in the spout arm and that preferably terminates at a distal end-adjacent spout arm location in a filtered water spout. The filtered water spout is preferably located in longitudinally spaced but adjacent relationship to the tap water spout. For user convenience, ease of use and to enable easy filling of a container with filtered water, the filtered water spout is preferably adapted for dispensing a filtered water stream at an angle which converges with the flow path of the water stream from the tap water spout. Such a spout configuration also enables a user to determine readily that filtered water is being dispensed.

Preferably, the spout arm is fixed to a sleeve at its inner or proximal end, and preferably the sleeve is pivotably located about the faucet body means preferably adjacent to but below the valve structure. Passageway(s) defined preferably in the sleeve are aligned with duct means in the spout arm and are adapted for receipt of water from a manifold in the faucet body means for spout dispensing.

Preferably, a single faucet actuator arm means is employed in a presently preferred faucet assembly and this arm means comprises an elongated actuating lever that has a unique type of pivotable movement capability. The preferred lever has the capability for a universal type of pivotable movement, and can be positioned at various user-selected and distinct locations. One class of locations results in the dispensing of filtered water only. Another class of locations results in the dispensing of hot, cold or mixed hot and cold tap water. Thus, a user can pivotably position the lever with one hand and thereby not only regulate and select the temperature and quantity of mixed hot and cold tap water issuing from an associated spout, but also thereby regulate and select the quantity of cold filtered water produced.

Various filter assemblies can be employed. Preferably, the presently provided new filter assembly incorporates a new and improved filter housing structure that includes a coacting case (or housing body) and cap that is adapted for use in combination with a replaceable filter cartridge or the like. The filter housing structure can be, and preferably is, mounted through (and in) a receiving aperture defined in a sink wall portion, preferably a portion located in the back deck area of a sink, basin or the like. Preferably, lower portions of the filter housing body or case, as the housing structure is mounted, are located mainly below the sink back deck and behind the sink basin so as to be in a space that was heretofore commonly unused. Concurrently, the upper end portions of the housing case extend upwardly from the adjacent sink portions and are provided with a removably associatable cap that is accessible from the upper or outer surface of the sink. Preferably, this cap is manually operated, a present most preferred arrangement being for this cap to be threadably and sealingly engagable with a top portion of the housing case and to be a closure that covers an upper end mouth defined in the top portion.

When the housing case is so mounted, and the cap is removed therefrom, a filter cartridge that is matingly associatable with the interior of the housing case can be inserted into and can be removed from the housing case. Thus, the filter cartridge can be changed by a user from above the exterior or upper surface of the sink. Preferably, a filter cartridge is manually deposited into and removed from the housing case while the cap is separated from the case mouth. Thus, a filter cartridge is easily and conveniently exchangeable through the mouth of the housing structure without the need for any tools or time-consuming procedure. Various filter cartridges can be used, but the present invention provides a new and improved filter cartridge structure which is adapted to be cooperatively associated with a filter housing structure of this invention.

The inventive filter assembly is preferably adaptable for internal association with the inventive faucet assembly in an embodiment of a combination assembly of this invention. This combination is preferably adapted to eliminate the need for any special plumbing beyond the conventional existing hot and cold tap water supply pipes (or conduits) for a kitchen sink. Conveniently and preferably, in such a combination, the filter assembly and the faucet assembly are associated together with a common housing means which is characterized by the feature that the filter assembly and the faucet assembly are preferably preliminarily functionally interconnected (or "pre-plumbed") before installation of such combination assembly at a sink or the like.

Conveniently and preferably in such a combination assembly, the faucet assembly employs a valve structure such that all fluid (such as water) flow controls thereof are substantially associated in one unit, preferably a cartridge type of arrangement. Various structures and/or configurations can be employed in a valve cartridge, but the present invention provides an improved valve cartridge structure which incorporates the inventive composite valve means with two stacked disks and which is adapted to be cooperatively associated with a valve body means of this invention.

Conveniently and preferably, movement of a valve assembly actuator arm means or the like controls fluid flow in the whole combination. Preferably, the valve assembly actuator arm means comprises a single lever although two lever arrangements can be employed, if desired.

In a preferred common housing structure, conduit or channel means extend between the faucet assembly and the filter assembly. Preferably the common housing structure includes an elongated shroud that extends over exterior upper and outer surface portions thereof. Preferably the common housing structure is adapted to rest upon and be secured to the back deck of an associated sink or basin.

The filter assembly incorporates a housing case that is preferably elongated, and adapted to be vertically oriented, when the inventive combination of faucet assembly and filter assembly is in its installed configuration in association with a sink. The filter assembly housing case is preferably generally cylindrically configured. Preferably, the access cover or housing cap at the upper end of the housing case is, when fully associated with the filter assembly, vertically adjacent to, but above, a shroud (or other adjacent combination component) of the common housing structure.

Alternatively, the filter assembly can incorporate a housing case that is preferably elongated, and adapted to be horizontally oriented. Preferably the housing case located above the associated sink, but is preferably completely covered by a common housing shroud when the inventive combination of faucet assembly and filter assembly is in its installed configuration in association with a sink. In this case, preferably the access cover or housing cap of the housing case is, when fully associated with the filter assembly, horizontally adjacent to the shroud.

If desired, the faucet assembly, the filter assembly and the interconnecting common housing structure can each include various other components as those skilled in the art will readily appreciate. For example, and preferably at a location in the common housing structure that is opposite to that where the filter assembly is located, a sprayer connector is preferably provided that is functionally associated with the faucet assembly. This sprayer connector is conventionally connectable with a conventional retractable spray hose so that mixed hot and cold water (or, if desired by a user, all hot or all cold water) from the faucet assembly can be fed into such hose instead of being discharged from the faucet assembly spout means.

The inventive faucet assembly and the inventive filter assembly can each be employed in other combinations independently of one another; for example, in other integrated combinations of a faucet assembly and a filter assembly, if desired.

Various other configurations, features, objects, aims, advantages, and the like that are associated with this invention will be apparent to those skilled in the art from the present specification, accompanying drawings and appended claims.

BRIEF DESCRIPTION OF THE DRAWINGS

In the drawings:

FIG. 1 is a partially diagrammatic perspective view of one embodiment of the inventive combination of faucet assembly and filter assembly, this embodiment being illustratively shown in an installed and operative association with an exemplary (fragmentarily shown) sink;

FIG. 2 is a longitudinal, medial, vertical fragmentary sectional view through the faucet assembly embodiment of the combination shown in FIG. 1 showing the spout arm turned 90° relative to its position in FIG. 1 and with the structure of the valve cartridge omitted;

FIG. 3 is a fragmentary right side (relative to the sink front) elevational view of the faucet assembly of FIG. 2 with the faucet lever, the spout arm and the shroud removed, with some parts thereof being broken away, and with some parts thereof being shown in section, this view illustrating lower portions of the faucet assembly;

FIG. 4 is similar to in FIG. 3 except that the faucet assembly is rotated clockwise by 90 degrees;

FIG. 5 is an enlarged detailed fragmentary sectional view showing the manifold and valve cartridge assembly of FIG. 2;

FIG. 6 is a bottom plan view of the manifold employed in the faucet assembly of FIG. 1;

FIG. 7 is a top plan view of this manifold;

FIG. 8 is a vertical sectional view taken along the line VIII—VIII of FIG. 7;

FIG. 9 is a vertical sectional view taken along the line IX—IX of FIG. 7;

FIG. 10 is a vertical sectional view taken along the line X—X of FIG. 7;

FIGS. 11A and 11B progressively show an exploded perspective view of the valve cartridge employed in the faucet assembly of FIG. 1;

FIGS. 12A–12H each show a bottom plan view of a different component of the valve cartridge shown in FIGS. 5 and 11A and 11B wherein:

FIG. 12A is the base cap;

FIG. 12B is the case;

FIG. 12C is the fixed valve disk;

FIG. 12D is the movable valve disk;

FIG. 12E is the guide plate;

FIG. 12F is the inner lever block;

FIG. 12G is the outer lever block; and

FIG. 12H is the valve lever;

FIGS. 16A and 16B correspond to FIGS. 11A and 11B, respectively, but these views each showing such valve cartridge in a valve open position for cold and hot tap water mixing and dispensing;

FIGS. 17A and 17B correspond to FIGS. 11A and 11B, respectively, but these views each showing such valve cartridge in a valve open position for cold tap water dispensing;

FIGS. 18A and 18B correspond to FIGS. 11A and 11B, respectively, but these views each showing such valve cartridge in a valve open position for hot tap water dispensing;

FIG. 21 is a longitudinal, medial, vertical fragmentary sectional view through the filter assembly embodiment in the combination shown in FIG. 1;

FIG. 22 is an enlarged detailed fragmentary vertical sectional view of the upper portion of the filter assembly shown in FIG. 21;

FIG. 23 is a right side (relative to the sink front) elevational view of the filter assembly of FIG. 21;

FIG. 24 is a top plan view of the filter assembly of FIG. 23;

FIG. 25 is a longitudinal medial vertical sectional view through the filter cartridge that is functionally associatable with the filter assembly of FIG. 21;

FIG. 31 is a view similar to FIG. 29, but showing another alternative inventive filter faucet combination and filter assembly.

DETAILED DESCRIPTION

Figure 12A:
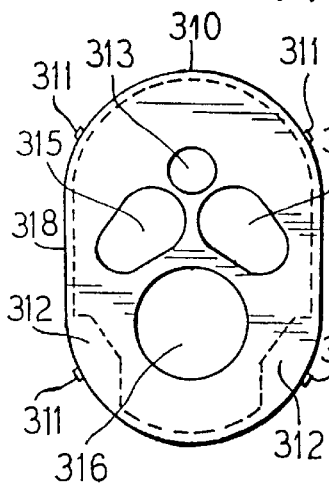

Referring to FIG. 1, there is seen an embodiment 20 of a combination of a faucet assembly 21 and a filter assembly 22 of the present invention (sometimes herein referred to for convenience as the filter faucet combination 20). The combination 20 includes an interconnective common housing structure 19 that interconnects the faucet assembly 21 and the filter assembly 22, that functions in associating the combination 20 with the back deck 34 of a sink 36, and that has defined therein interconnecting channel means (as described below).

As shown in, for example, FIGS. 2–4, the faucet assembly 21 is preferably comprised of cast, molded, and or machined metal or plastic (the latter now preferred) components. A presently most preferred plastic is "Amodel," a trademark of The Amoco Corporation for a brand of synthetic resins containing polymers and copolymers of polyamides and their derivatives.

Faucet assembly 21 can be considered to incorporate a lower body portion 23 (see FIG. 3). The lower faucet body portion 23 includes cold and hot tap water input pipes 24 and 25, respectively, and a sprayer pipe 26 (see FIG. 1 or FIG. 5, for example). The lower faucet body 23 is preferably and as shown extendable through a preformed aperture 35 (see FIG. 2) in the back deck 34 of the sink 36 until abutment of bottom surface portions of the common housing structure 19 with the deck 34 occurs. A hot tap water supply line (not shown but conventional) is connected to hot tap water input pipe 25 and a cold water supply line (not shown but conventional) is connected to cold tap water input pipe 24 (by threaded fittings or the like).

Sprayer pipe 26 is preferably (and as shown) threaded on the outside so as to threadably engage matingly a preferably (and as shown) elongated retainer nut 28. A retainer plate 29 slidably engages over sprayer pipe 26 and is placed between the bottom side of the sink deck 34 and the retainer nut 28. Tightening of retainer nut 28 presses retainer plate 29 against the sink deck 34 and thereby clamps the common housing structure 19 and associated components against the upper surface of deck 34. Optionally, and as shown, pipe 26 can be provided with a terminal lock nut 31 that is longitudinally adjacent to and below nut 28. The filter faucet combination 20 is thus positioned firmly in place relative to sink deck 34. Various means can be employed to connect a combination 20 with a sink 36 as those skilled in the art will appreciate.

The faucet assembly 21 can be considered to incorporate a mid-body portion 45 (see FIG. 3) with which the lower body portion 23 integrally connects. Mid-body portion 45 includes a generally cylindrical and cross-sectionally circularly configured and preferably unitarily formed manifold 40 (see FIGS. 6–10) which is comprised preferably of cast, molded, and/or machined metal or plastic (the latter now preferred). The manifold 40 is provided on its lower face (see FIG. 6) with the openings 291 and 292 of each of a pair of internally and longitudinally extending channels 41 and 42, respectively, that sealingly interconnect (by threads, adhesive or the like) with water input pipes 24 and 25, respectively. Thus, hot and cold water entering in respective pipes 25 and 24 can pass upwardly through connected respective channels 42 and 41 into what can be considered to comprise the upper body portion 47 of the faucet assembly 21 (see FIG. 3). The upper body portion 47 integrally connects with the mid-body portion 45 and the upper body portion 47 includes a valve cartridge 300.

In the common housing structure 19, a pair of horizontally extending, water conveying pipes 69 and 87 are provided that extend in generally spaced, parallel relationship to one another. Pipe 69 serves to convey (or divert) water from the valve cartridge 300 to the filter assembly 22, and, for that purpose, its distal (output) end connects sealingly to a lower port 74 defined in filter cartridge housing 71 (see FIG. 23, for example), and its proximal (input) end connects sealingly to an output channel 44 via opening 294, both of which are defined in manifold 40 (see, for example, FIG. 3). Pipe 87 serves to return (or deliver) water back from a sealingly connected output port 75 in the filter assembly 22 to a sealingly interconnected input port 295 in the manifold 40. Port 295 joins channel 83 in manifold 40 (see, for example, FIGS. 4, 6 and 10).

Circumferentially extending channels 82 and 83 are defined in axially spaced, adjacent relationship to one another in outer cylindrical surface portions of manifold 40 and extend circumferentially around manifold 40 (see FIGS. 3–5). Channels 82 and 83 are maintained in fluid tight relationship with respect to each other. Thus, manifold 40 is circumscribed by a sleeve 81 (see FIGS. 2 and 5). The respective upper and lower side walls of channels 82 and 83 respectively are defined by flange-like portions 91, 92 and 93 (see FIG. 5) defined in adjacent outer circumferential portions of manifold 40. Each such portion 91, 92 and 93 has an O-ring receiving groove 94, 95 and 96, respectively (see FIG. 5), defined circumferentially therein into each which an O-ring 66 is positioned. These O-rings 66 each sealingly but slidably engage inside surface portions of sleeve 81.

Sleeve 81 is connected functionally in one portion thereof to the proximal end of a radially outwardly extending spout arm 53. Preferably, sleeve 81 and spout arm 53 are of integral one piece molded and machined construction. Thus, arm 53 is pivotable with sleeve 81 about the axis of the manifold 40. The distal end of spout arm 53 is provided with a preferably downwardly opening terminal tap water aperture or spout 56 that is conveniently, conventionally, and preferably terminally associated with a conventional aerator 57. An exterior shell 88 (see FIG. 5, for example) is preferably and as shown included. Shell 88 is adapted to extend over and around exterior outer surface portions of sleeve 81 and spout arm 53. Shell 88 can be conventionally comprised of metal or plastic and usually has the exterior appearance of polished chrome.

Spout arm 53 is provided with a pair of internal ducts 64 and 65 (see FIGS. 2 and 5 for example) that longitudinally extend therein. Duct 64 communicates with the spout 56 at the distal end thereof, and extends through a bore 86 in sleeve 81 to connect with channel 82 at the proximal end of spout arm 53. Duct 65 communicates at the distal end thereof with filtered water spout or aperture 67 in spout arm 53. Spout 67 is located terminally in spout arm 53 in inwardly spaced adjacent relationship to spout 56. Spout 67 is also conveniently, conventionally, and preferably terminally associated with a conventional aerator 57. The proximal end of duct 65 communicates with channel 83 through a bore 89 in sleeve 81. In the combination 20, input tap water (whether mixed hot and cold, or either hot or cold) exits through spout 56 while filtered water exits through spout 67, depending upon the position of the elongated faucet handle lever arm 51, as described herein.

Figure 12B:
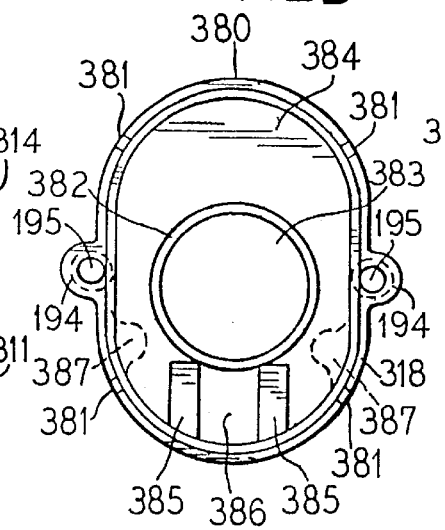
Figure 12C:
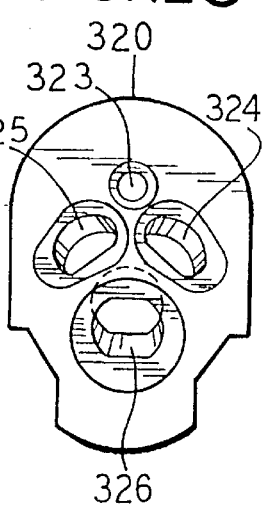
Figure 12D:
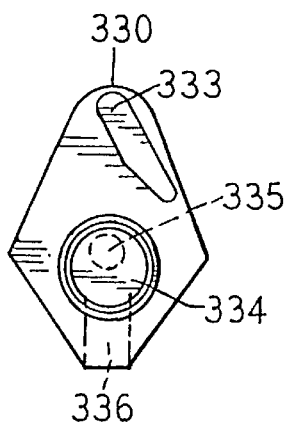
Figure 12E:
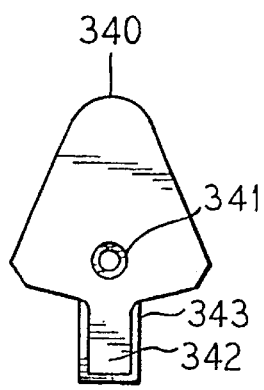
Figure 12F:
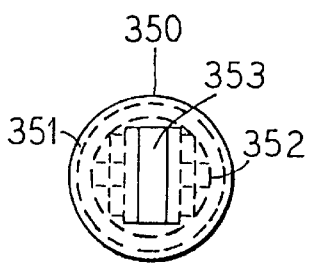
Figure 12G:
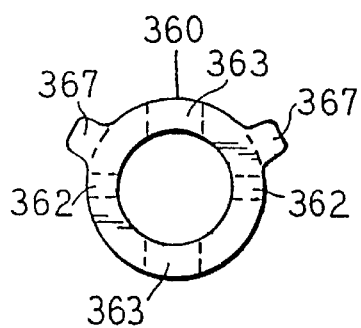
Figure 12H:
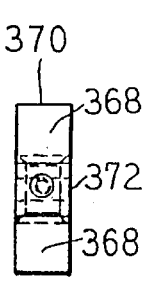

As shown, for example, in FIGS. 11A and 11B and in FIGS. 12A–12C, the valve cartridge 300 is here oblong in transverse cross-sectional configuration. The assembled valve cartridge 300 is mounted with a pair of conventional screws 401 such that each screw 401 extends through a different respective longitudinal bolt channel 195 (pair) in an ear 194 formed integrally on opposing sides of the case 380 of valve cartridge 300 (see, for example, FIG. 12B) and threadably engages matingly one of a pair of sockets 196 on each opposite side of manifold 40 (see, for example, FIG. 7). A preformed adapter ring 85 provides a peripheral smooth connecting junction between the top of cross-sectionally circular manifold 40 and the base of cross-sectionally oblong cartridge 300 and serves to convert the circular configuration of manifold 40 into the oblong configuration of cartridge 300.

Valve cartridge 300 in the assembled faucet assembly 21 has its side walls and peripheral portions of its top covered by a preformed valve cover 84 (see FIG. 5) whose lower edge portions contact upper edge portions of adapter 85. On the top of the valve cartridge 300, a dome-configured cap 54 is positioned. Beneath the cap 54 and over the valve cartridge 300 and also peripheral portions of the cap 84, a head chamber 43 is defined. The head chamber 43 contains the interconnective mechanism 365 between the valve component assembly in valve cartridge 300 and the elongated faucet handle lever arm 51. The head chamber 43 is defined under the cross-sectionally generally circularly configured dome cap 54 and above top portions of the valve cartridge 300. A snap ring connection 55 is provided between a top peripheral portion of valve cover 84 and a bottom peripheral portion of dome cap 54, thereby providing a close fitting junction between cap 54 and cover 84.

An opening 59 is defined in a top portion of dome cap 54 which allows for a direct connection of the distal end region of valve lever 370 of the cartridge 300 with the elongated faucet handle lever arm 51 by means of a retainer bolt 52. The proximal end of the lever arm 51 is provided with a preferably integrally associated (by molding or the like) cover 58 whose down-turned circumferential rim is in adjacent but closely spaced relationship to exterior surface portions of dome cap 54. The so connected proximal end of the lever arm 51 with cover 58 preferably completely covers the opening in dome cap 54 at any position in which it can be placed through manual movement of the lever arm 51.

Thus, an operator (or user) of the combination 20 can manually move the outer or distal end of lever arm 51 through a pivotable and rotational (left to right or vice versa) path and through a vertical (up and down or vice versa) path. The lever arm 51 distal end position along the rotational path regulates water temperature and the vertical path regulates water flow. The limits of arm 51 movement are preset for a given faucet by mechanical barriers or stops. Thus, the rotational path has one barrier on each opposite side which is achieved through contacting of barrier keys 387 by ears 367 on outer block 360 (see, for example, FIGS. 17A and 18A). The vertical path has three barriers as described herein. In what can be considered to be the normal lever arm 51 position, which allows dispensing of hot, cold or admixed hot and cold water, the lever arm 51 can be moved arcuately between the two opposite side barriers of the rotational path, and between the two successive uppermost barriers of the vertical path. The upper one of these two vertical barriers is fixed, but the lower one of these two vertical barriers is only a so-called soft barrier, which can be overcome through user-applied additional downward pressure on lever arm 51. Once the lever arm 51 is pivotably moved downward past this soft barrier, it can not be moved sideways, but only vertically downwards, until the lever arm 51 reaches or abuts against a final fixed barrier. In this lower portion of the vertical path that extends between the soft barrier and the final barrier, cold water only is diverted by valve cartridge 300 to the filter assembly 22, filtered therein, and returned from there to the spout 67 on spout arm 53.

Between the opposite side barriers and the vertical barriers, various possible positions for lever arm 51 can be chosen for a given embodiment of a faucet assembly so that the lever arm 51 can be considered to be infinitely adjustable between zonal end barriers. However, in the presently preferred form of combination 20, and of faucet assembly 21, the preferred positions of faucet lever arm 51 are such that:

When the lever arm 51 outer (or distal) end is placed approximately perpendicularly relative to faucet assembly 21 in about a 0° forward orientation with regard to its rotational path (i.e. so as to extend over the associated sink 36), and so is located in its downwardmost position (see FIG. 19, position C), the faucet assembly 21 dispenses cold filtered water only.

When the lever arm 51 outer end is raised upward so as to rest just above its soft barrier (see FIG. 19, position A), the faucet assembly 21 is turned off.

When the lever arm 51 outer end is raised further upwards along a vertical arcuate path, the tap water flow rate through spout arm 53 increases to a maximum (or full flow capacity) where the lever arm 51 outer end reaches its uppermost position (see FIG. 19, position B), here equal amounts of hot and cold tap water are being mixed together in and dispensed from faucet assembly 21. At full flow capacity, the lever arm 51 is at its maximum vertical inclination angle with the lever arm 51 outer end being approximately at its uppermost 0° position with regard to its rotational path.

When the faucet lever arm 51 is moved upwards to a location where water flow occurs, and the lever arm 51 outer end is pivotably turned to its maximum left extent, only hot tap water enters and exits the faucet assembly 21.

When, correspondingly, the lever arm 51 outer end is pivotably turned to its maximum right extent, only cold tap water enters and exits the faucet assembly 21.

The internal changes concurrently occurring within the faucet assembly 21 with these movements of faucet lever arm 51 are explained below.

Vertically the valve cartridge 300 in faucet assembly 21 is located between the manifold 40 and the head chamber 43. Major components of this valve cartridge 300 are individually shown in FIGS. 11A, 11B and in FIGS. 12A–12H, and their relationship to each other is shown, for example, in FIGS. 5 and 13. In general, the valve cartridge components can be regarded as being stacked in a pyramid-like fashion. A base or cap plate 310 is provided at the bottom end. Then follows a fixed disk 320, a movable disk 330, a guide plate 340, and then a lever assembly 365. A lever assembly 365 includes an inner block 350, an outer block 360, and a projecting valve lever 370. These components are cooperatively engaged and encased as a functional cartridge-type unit within the case 380, which, as above-indicated, is mounted onto the upper end of manifold 40 with two screws 401.

At its bottom, the cartridge case 380 is closed by the cap 310 which is nestably received within the bottom opening mouth of case 380 and which rests in contacting relationship over portions of the upper end of the manifold 40. The cap 310 has an upstanding perimeter flange 318. The cap 310 is held in a fixed position in the cartridge case 380 by four outwardly projecting keys 311 circumferentially spaced about flange 318. Each key 311 matingly fits into a different one of four individual cutouts 381 defined in the case 380. The upper (inner) side of the cap 310 has two opposed keys 312 located adjacent flange 318. Keys 312 provide for a unique fit of the fixed disk 320 relative thereto.

The cap 310 has a plurality of ports 313, 314, 315 and 316 which are defined transversely therethrough and which are each aligned and sealed with ports 323, 324, 325 and 326, respectively, that are defined in fixed disk 320. These respective port pairs are maintained in sealed engagement with each other by flat (that is, cross-sectionally rectangular) O-rings 393, 394, 395, and 396 which line the walls of respective ports 313, 314, 315, and 316 in cap 310. Since these O-rings are each slightly wider than the thickness of cap 310, the top edge portions of each of these O-rings also fit into respective seats defined around each of the ports 323, 324, 325, and 326 in the fixed disk 320 (see FIG. 12C). The bottom edge portions of each of these O-rings provide a seal around, and in, seats provided about each respective port 141, 142, 143 and 144 respectively, on the upper end face of manifold 40 (see FIG. 7). Thus, cold water input pipe 24 is axially aligned with input ports 314 and 324 (and also with opening 291, channel 41 and port 142), and hot water input pipe 25 is axially aligned with input ports 315 and 325 (and also with opening 292, channel 42 and port 143). Similarly, channel 44 (leading to filter assembly 22 from valve assembly 21; see FIG. 6) is axially aligned with exit ports 313 and 323 (and also with opening 294 and port 141). Exit ports 326 and 316 are axially aligned with a conventional diverter 403 (and also with opening 293, port 144 and pipe 26), which sits in tap hole 402 in manifold 40. Diverter 403 diverts the incoming water either toward the tap water spout 56 via channel 82 and duct 64, or to the conventional water spray subassembly 140 via sprayer pipe 26. Diverter 403 is well known to the prior art.

The movable disk member 330 is slidably movable relative to the fixed disk member 320 and disk 330 is positioned above, and in direct interfacial contact with, fixed disk 320. Both disks 330 and 320 are preferably comprised of ceramic material. On the bottom side of the a disk 330 (see FIG. 12O) which contacts the top side of disk 320 two cavities 333 and 334, respectively, are defined. Cavity 334 serves as a mixing and connecting chamber, and, depending upon the position of disk 330, connects exit port 326 on fixed disk 320 with either or both input ports 325 and 324 on the disk 320, for the purpose of admitting either hot, cold, or admixed hot and cold tap water to the spout 56. Cavity 333 serves to connect input port 324 with exit port 323, which serves to route (divert) cold tap water to the filter assembly 22. Thus, the cap 310, fixed disk 320, and the movable disk 330 contain all channels for water flow and are the only components of the valve cartridge 300 that are in direct contact with water.

The disks 320 and 330 are sealed together by pressure which is exerted on them by other valve cartridge 300 components when the assembled valve cartridge 300 is connected to the manifold 40 by the two screws 401.

Movement of disk 330 by lever arm 51 is mediated by a lever assembly 365, which as above-indicated, includes the outer block 360, the inner block 350, and the lever 370. Lever 370 is connected at its top or distal end to the proximal end of lever arm 51, and at its bottom or proximal end to movable disk 330, as described below. The inner block 350 has an upstanding peripheral lip flange 351 which fits snugly but slidably into a circular downwardly extending seat flange 382 in the underside of the shelf or top face 384 of case 380. Most of the body of inner block 350 protrudes through the lever assembly hole 383 in case 380. The outer block 360 slides over the upper face of the inner block 350, and makes contact on its bottom face with the top side of shelf 384. Thus, the lever assembly 365 contacts the shelf 384 on either side thereof freely and movably, and so assembly 365 can rotate inside the hole 383. This movability permits the rotational path of lever arm 51 to be achieved. This path in the present embodiment is an arcuate path of about 150 degrees, as below described.

The lever 370 is mounted through the cutout 353 in the inner block 350. Lever 370 is held in position by a retainer pin 371, which also firmly connects the outer block 360 and the inner block 350 through horizontal pin cavities 372, 362, and 352 respectively. This pin connection allows for a pivoting movement of the lever 370. Thus, the vertical up and down movement of the lever arm 51 is achieved yet this movement is arrested on either side when one of the wings 368 of the lever 370 contacts the bottom of one of an opposing pair of cutouts or slots 363 in the outer block 360. These arrest positions provide the firm barriers to the limits of vertical movement of the lever arm 51. A soft arrest position is provided on one side (see FIG. 13), where one of the two opposed lever wings 368 contacts both spring biased ball plungers 373 which are mounted on opposing sides of the outer block 360.

The bottom end of lever 370 is attached to movable disk 330 in a manner that allows transfer of all vertical and rotational (lateral and pivotal) motions from the lever arm 51 to the movable disk 330. To achieve this attachment, the bottom end of lever 370 is spherically shaped and fits into the spherical lever cavity 335 defined on the top side of movable disk 330 (see FIG. 11). However, because the movable disk 330 is preferably comprised of ceramic material, while the lever 370, the underside of the shelf 384, and also the inner block 350 are each preferably comprised of plastic material, a direct contact between these plastic and ceramic components would tend to result in relatively rapid wear. Preferably, such a wearing is prevented by covering the ceramic movable disk 330 with the guide plate 340, which generally has a shape that is similar to that of the top side of the movable disk 330 and which is comprised of plastic material. The guide plate 340 has integrally formed therein a cup-shaped cavity 341 which engages and covers the inside surfaces of the lever cavity 335 (see FIG. 13, for example) and which permits the bottom end of lever 370 to extend thereinto and freely rotate therein. Guide plate 340 has a nose portion 342 with a peripheral down-turned flange 343 (see FIGS. 11B and 12E). A nose portion 336 is defined integrally on the upper surface of movable disk 330. The nose portion 342 is adapted to overlie the nose portion 336 and the flange 343 is adapted to extend peripherally around the sides of nose portion 336, thereby to provide a cover for nose 336. The respective dimensions of the guide plate 340, its flange 343 and its cavity 341 are such that the guide plate 340 has no movement (or slack) relative to disk 330 when the guide plate 340 is nestably engaged over the movable disk 330.

Figure 13:
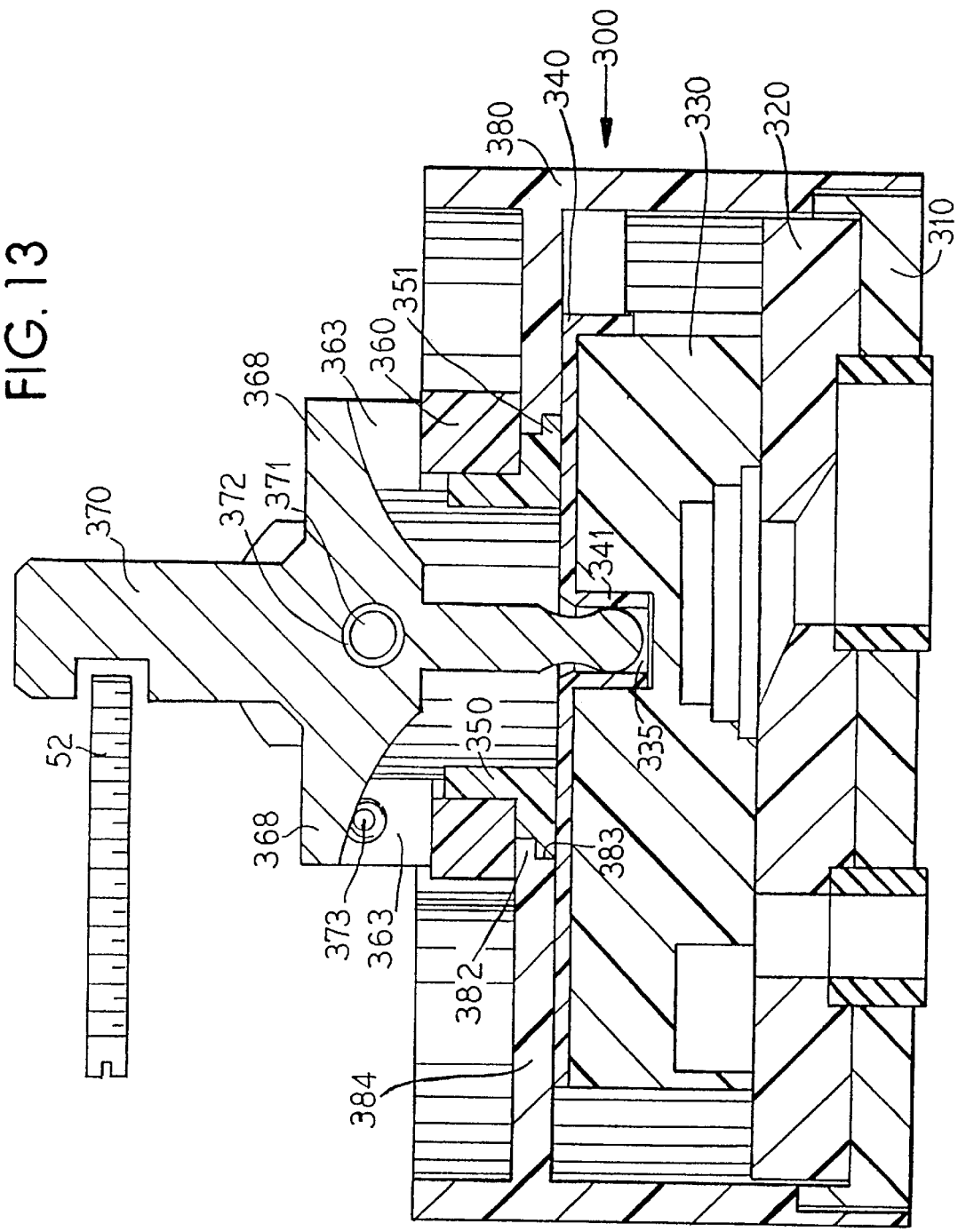
FIG. 13 is a longitudinal medial vertical sectional view through the (assembled) valve cartridge of FIGS. 11A and 11B.
Figure 14A:
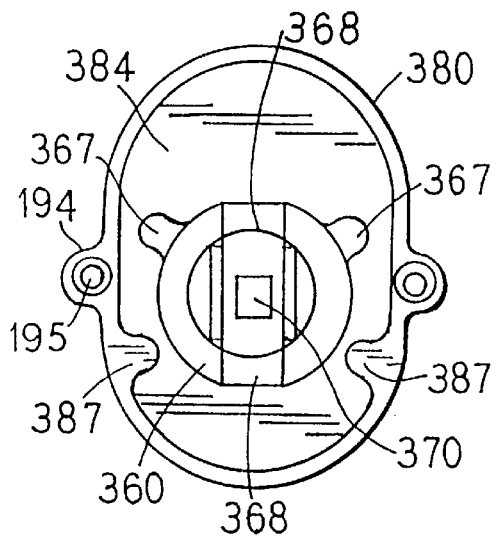
FIG. 14A shows a top plan view of the assembled valve cartridge of FIGS. 11A, 11B and 13, and the companion
Figure 14B:
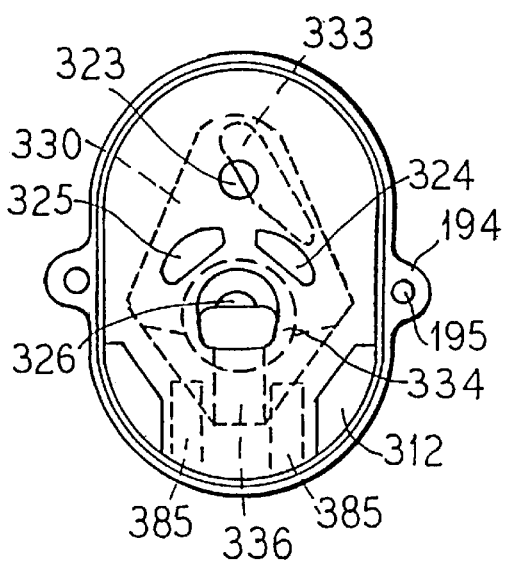
FIG. 14B shows a corresponding bottom plan view of this assembled valve cartridge, these views each showing such assembled valve cartridge in the valve closed position (with some associated components that are present in the assembled faucet assembly shown in FIGS. 1 and 2 being removed, and with some components and component features of FIG. 14B being shown in phantom and diagrammatically)

Nose 336, clad with cover 342, fits into a guide cavity 386 which is provided on the underside of shelf 384 of case 380 (see, for example, FIG. 13). Shelf 384 has opposed internal side walls that are defined by a pair of laterally spaced upstanding guide ribs 385, integrally formed on shelf 384 (see, for example, FIG. 12B). As shown in FIGS. 14A and 14B for example, when the faucet assembly 21 is in its valve closed position, nose 336 is positioned so that approximately 50% thereof is located in the thus defined guide cavity 386. At this position, both of the hot and the cold tap water input ports 325 and 324, respectively, in disk 320 are sealed by movable disk 330, so no water flow occurs through cartridge 300.

Arcuate lifting and pivoting of the distal end of lever arm 51 vertically (toward the back of the faucet assembly 21) results in sliding movement of movable disk 330, clad with guide plate 340, toward the front of the faucet assembly 21, whereby the nose 336 moves over disk 320 toward the open end of guide cavity 386, until it arrests (stops) just before it reaches the end of the cavity 386, never completely leaving it. In this position, mixing chamber or cavity 334 defined in the movable disk 330 overlaps and thereby interconnects both of the hot and the cold water input ports 325 and 324 with the exit port 326 of disk 320, thereby achieving full admixed tap water flow, while simultaneously sealing exit port 323 of disk 320 (see FIGS. 16A and 16B).

By moving toward the open end of guide cavity 386, the movable disk 330 achieves more and more lateral flexibility, i.e. movability toward left or right, relative to fixed disk 320 which provides for sliding movement of movable disk 330 in two directions relative to fixed disk 320. FIGS. 17A and 17B show the position of movable disk 330 for full unfiltered cold water flow only, whereby mixing chamber or cavity 334 overlaps and thereby interconnects cold tap water input port 324 with tap water exit port 326, while simultaneously sealing tap water exit port 323 and hot tap water input port 325.

FIGS. 18A and 18B show the position of movable disk 330 for full hot tap water flow only, whereby mixing chamber or cavity 334 overlaps and thereby interconnects hot tap water input port 325 tap water with exit port 326, while simultaneously sealing filtered water exit port 323 and cold tap water input port 324.

Figure 15A:
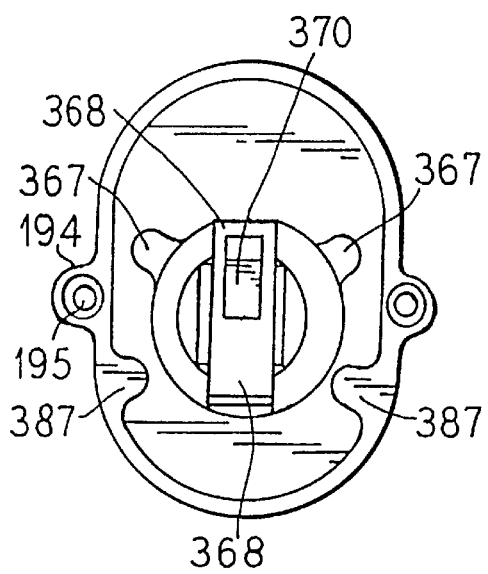
FIGS. 15A and 15B correspond to FIGS. 14A and 14B, respectively, but these views each showing such valve cartridge in a valve open position for water filtering and dispensing.
Figure 15B:
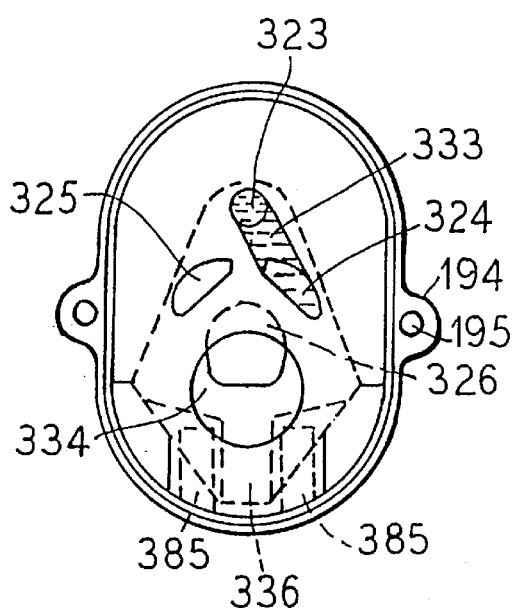

Movement of movable disk 330 toward the closed end of guide cavity 386 progressively reduces the lateral slidability of movable disk 330. Thus, by the time that the nose 336 has entered about 50% of the guide cavity 386, no lateral (left to right or vice versa) sliding movement thereof is possible (see FIGS. 14A and 14B). At this position, the valve lever 370 has reached its soft arrest position (no water flow), as indicated above. Sliding movement of movable disk 330 beyond this position is achieved through manual depression of the distal end of the lever arm 51 further downward, and this movement produces movement of nose 336 toward the closed end of guide cavity 386 (see FIGS. 15A and 15B). This movement results in the diverting of cold tap water only because lateral sliding movement of disk 330 is prohibited by the ribs 385 and such diverted tap water flows in pipe 63 from faucet assembly 21 to the filter assembly 22. The water diverting cavity 333 overlaps and thereby interconnects the cold water input port 324 with the exit port 323.

Figure 19:
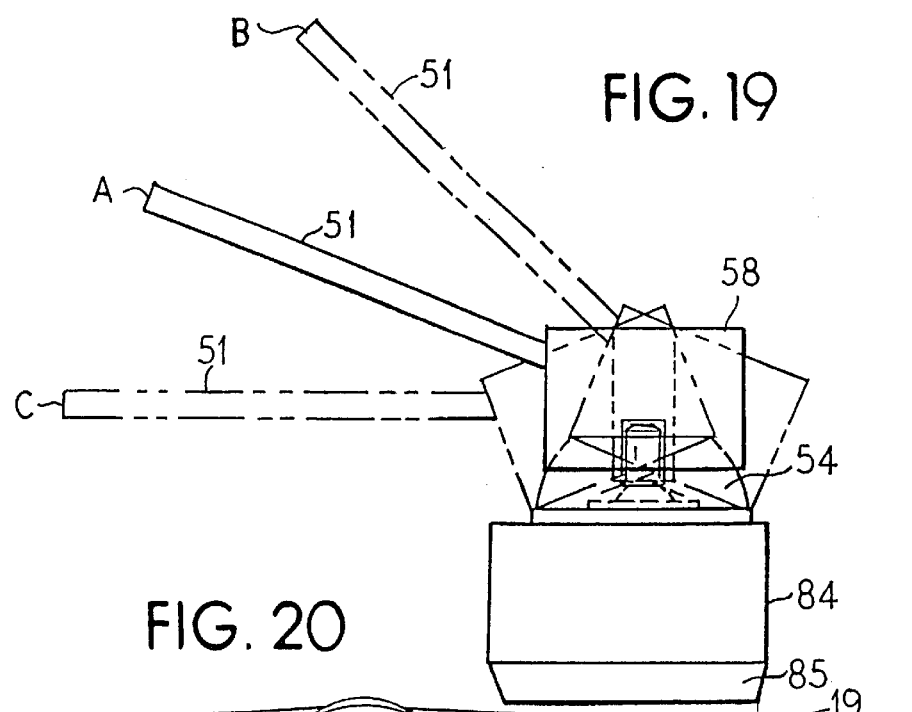
FIG. 19 is a partially diagrammatic side elevational view of the upper portion of the faucet assembly shown in FIG. 1, this view illustrating various vertical positions assumable by the pivotable faucet lever when functionally associated with the (assembled) valve cartridge of FIGS. 11A, 11B and 13.
Figure 20:
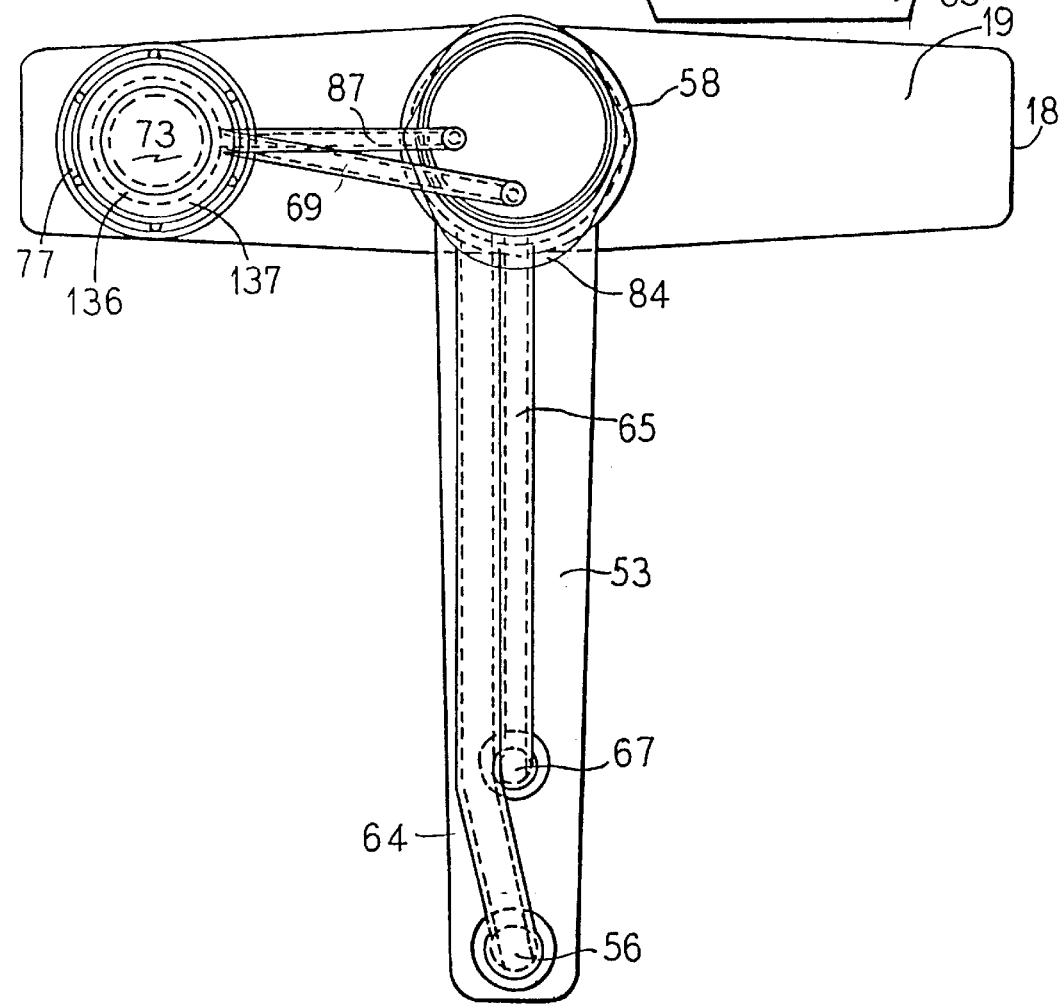
FIG. 20 is a partially diagrammatic fragmentary top plan view of the combination shown in FIG. 1 with some parts thereof being shown in phantom and with upper portions of the faucet assembly not being shown.
Figure 26:
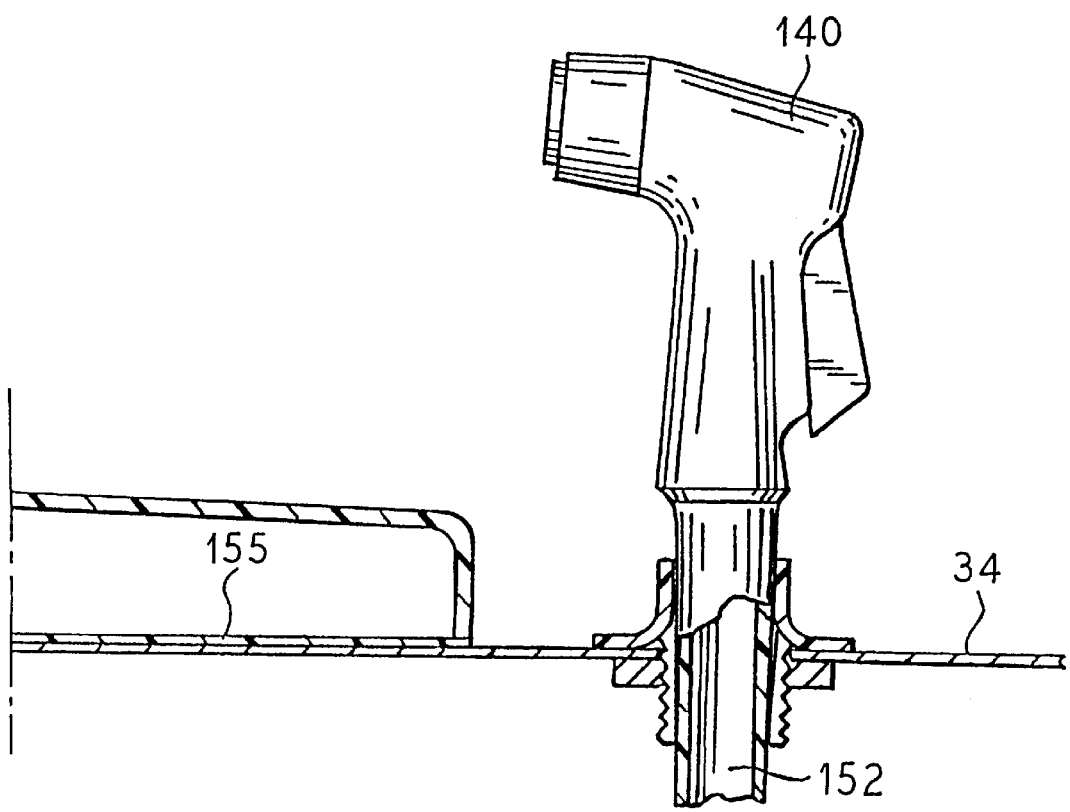
FIG. 26 is a side elevational view of the (conventional) sprayer assembly that is functionally associated with the (fragmentarily shown) combination of FIG. 1, some parts thereof being broken away and some parts thereof being shown in fragmentary section.

Referring to FIG. 19, there is shown position A for faucet lever arm 51 when the valve in cartridge 300 is in the valve off position, position B for faucet lever 51 when the valve in cartridge 300 is in the valve on position with full flow of hot and cold tap water to produce a mixture of unfiltered tap waters, and position C for faucet lever 51 when the valve in cartridge 300 is in the valve on position with full flow of only cold tap water for diversion in water filtration.

The interrelationship between the components including the lever arm 51, the spout arm 53, the head chamber 43, the manifold 40, and the components of valve cartridge 300 (specifically, the disks 330 and 320), is such that the following water flow settings through the spout arm 53 can each be independently and separately achieved by positioning the distal end portion of the lever arm 51:

(1) No water flows from the spout arm 53;

(2) Only hot tap water flows from the spout arm 53;

(3) only cold tap water flows from the spout arm 53;

(4) Only a mixture of hot and cold tap water flows from the spout arm 53, the water flow volume and the mixture ratio of hot to cold tap water being exteriorly regulatable by the spatial position of the lever arm 51 distal end portion; and (5) Only initially cold but interveningly diverted and returned processed water flows from the spout arm 53, the water flow volume being exteriorly regulatable by the spatial position of the lever arm 51 distal end portion.

When, in the operation of the filter faucet combination 20, cold tap water is being filtered, cold tap water enters the valve cartridge 300 from channel 24 only. Tap water is routed from cartridge 300 through channel 44 and pipe 69 and passes to the filter assembly 22 for filtering (as is below described).

After filtration in filter assembly 22, filtered water flows back through pipe 87 to the manifold 40 and moves from there through channel 65 to spout 67. Although various arrangements are possible, it is now preferred to have the filter return conduit pathway always open; this arrangement is preferred because it prevents the build up of water pressure in the filter assembly 22 when water is not being processed through it. Thus, for example, water will not spurt out of the filter assembly 22 when the cover 77 is removed for filter cartridge 73 replacement.

Since, in a contemporary kitchen sink, a faucet-associated spray hose is commonly and conventionally located on the right side of the faucet, in the preferred practice of the present invention, the filter assembly 22 is preferably located on the left side of the faucet assembly 21 as provided in the combination 20. However, various positions and locations can be employed for a filter assembly 22 of this invention and for a spray hose, as those skilled in the art will readily appreciate.

Here, the filter assembly 22 incorporates a filter housing 71 that is, preferably and as shown, axially cylindrical, elongated and adapted to receive through the upper end thereof a selected filter cartridge 73 which can be conventional, if desired, but which is adapted for seating cooperatively in the housing 71 in a functional position. Thus, as is further explained below, in assembly 22, when the upper end mouth 72 of the housing 71 is sealingly closed by a removable cover or cap 77, water entering the housing 71 at the entry port 74 from the channel 69 passes between the filter cartridge 73 and the wall of the housing structure 71 to enter the filter cartridge 73 from its bottom. After passing through the filter cartridge 73, the filtered water then leaves the cartridge 73 and the housing 71 through the exit port 75 into return pipe 87. As those skilled in the art will readily appreciate, if desired, the water flow through the filter cartridge could be reversed by connecting pipe 87 to the port 74, and the pipe 69 to the port 75. The removable access cover or cap 77 is threadably and sealingly engagable with a threaded top lip portion about the mouth 72 of the housing 71 as below described.

In the preferred combination 20, the filter assembly 22 has its housing 71 and cap 77 preferably comprised of plastic, but these components can be formed of metal, if desired. The housing 71 is preferably perpendicularly oriented and configured to protrude downwards through, and to be directly or indirectly suspended from, the rear deck 34 of a sink such as sink 36, so as to be typically behind a sink 36 bowl or basin compartment 76 (see FIG. 1). Preferably, housing 71 extends through a preformed standard hole 37 in deck 34. Servicing and replacement of a filter cartridge 73 is conveniently accomplished by manually removing the cover 77. Conveniently, the outer circumferential portions of cover 77 are ribbed, knurled or the like to provide a convenient and hand-grippable surface for easy manual removal and tightening.

The upper portion of the housing 71, which is located above sink deck 34, is preferably widened relative to the lower portion of the housing 71 by means of a circumferentially extending shoulder 104 formed in housing 71. This shoulder 104 fits through and seats in a tapered opening of a shroud gasket 155 at the bottom of a shroud 18 of the common housing structure 19 (for example, see FIG. 21). The lower portion of the housing 71 preferably has a diameter which fits through a standard opening 37 commonly provided in the back deck of a sink 34. At its bottom end, the housing 71 is closed by an end wall 97. Housing 71 defines therein a filter cartridge-receiving cavity 101, with preferably a wider interior upper portion 137 existing in the upper portion of housing 71. Various configurations and structures can be employed for a housing 71 and a cap 77.

Here, the cap or cover 77 has an axially extending perimeter flange 102 which is interiorly circumferentially threaded for disengagable engagement with the externally circumferentially threaded lip portion 99 of mouth 72 of housing 71. Like housing 71, cap 77 is preferably comprised of one piece, molded plastic construction. Radially inset from the perimeter flange 102 a sealing flange 103 is preferably provided which is generally in spaced, parallel relationship to flange 102. This flange 103 contains a circumferential groove 110 which seats O-ring 109. The upper inside surface of the lip portion 99 is slightly tapered in a funnel-like configuration. This configuration provides for a sealing engagement between this tapered surface and the O-ring 109. Thus, sealing means is provided between the cap 77 and the lip portions 99 for sealingly associating the cap 77 with the housing 71 when the cap 77 is substantially fully engaged with the housing 71.

The inventive filter cartridge 73 which is here employed is cooperatively associatable with the filter assembly 22 yet is conveniently conventional in internal construction (that is, the filter medium is preferably conventional). Cartridge 73 has a housing 111 that is preferentially comprised of a molded plastic and is preferentially configured to have external surface portions that align with internal surface portions of the housing 71 and cap 77. Thus, the housing 111 has a lower body portion 112 and an upper body portion 113 which are separated from one another externally by a circumferentially outwardly extending ridge 79 around which an O-ring 80 is seated in a groove. The ridge 79 is positioned such that the O-ring 80 makes circumferentially a sealing contact with side wall 98 of housing 71 at an axial location between the entry port 74 and the exit port 75 of housing 71. This location is such that the housing 71 and the housing 111 coact to provide two separate chambers within the filter assembly 22, identified as upper chamber 136 and lower chamber 137.

Below the ridge 79 the housing 111 has a plurality of circumferentially spaced, radially outwardly extending spoke-like protrusions 105 which circumferentially extend about housing 111 and which make contact with interior surface portions of shoulder 104 of housing 71. Thus, when the housing 111 is fully extended into and engaged with the housing 71, the cartridge 73 is seated in place between the underside of the sealing flange 103 of cap 77 and the shoulder 104 of housing 71, with the O-ring 80 being positioned as desired between ports 74 and 75.

At the lower end of the housing 111 cartridge 73 is provided with a plurality of input orifices 139. Circumferentially spaced about the upper end of housing 111 adjacent to the housing head plate 114 are a plurality of output orifices 138. The upper face of the head plate 114 is provided with a recessed, diametrically extending crossbar 115 that is adapted for engaging a fork tine or the like that is extended into the adjacent recess (thereby to aid the user in removing a filter cartridge 73 from housing 71).

The interrelationship between the fully engaged filter cartridge 73 and the housing 71 is such that the opposed lower end and upper end of body portions 112 and 113, respectively, of the cartridge housing 111 are generally in radially spaced, adjacent relationship to adjacent inside surface portions of the filter assembly housing 71. This spacing defines the lower chamber 137 and the upper chamber 136, respectively.

Thus, tap water being filtered enters from entry port 74, fills the lower chamber 137, enters the lower end of the cartridge 73 through orifices 139, and passes upwardly through cartridge 73 and is thereby filtered. The filtered water exits through orifices 138, fills the upper chamber 136 and exits the filter assembly through port 75. As those skilled in the art will readily appreciate, various alternative cooperative arrangements between a filter cartridge housing 111 and a filter assembly housing 71 can be utilized, if desired.

A conventional water spray subassembly 140 is conveniently and preferably associated with the faucet assembly 21. The assembly 140 includes a conventional spray hose 152 that is attached to the threaded end of a sprayer adapter 30 preferably with a conventional nut 32. The valved nozzle (not detailed) associated with the distal end of the spray hose 152, when open, dispenses water received from diverter 403 through the sprayer pipe 26.

Conveniently, and, if desired, the combination 20 and its associated components, including the faucet assembly 21, the valve cartridge 300, the common housing structure 19, the filter assembly 22 including the filter housing 71, and a filter cartridge 73 can be assembled and sold as a complete unit ready for installation at a kitchen sink.

Alternative embodiments of a combination of filter assembly 22 and faucet assembly 21 are shown in FIGS. 27 to 32. In these FIGS. 27–32, respective components which are like or are similar to those in the filter faucet combination 20 are similarly numbered but with the addition of prime marks for identification purposes.

Figure 27:
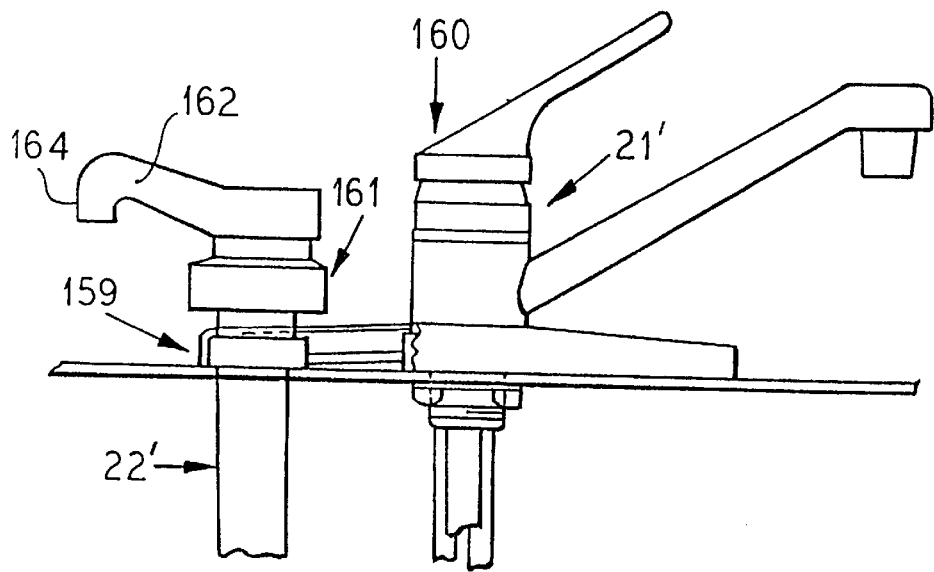
FIG. 27 is a (front) side elevational view of an alternative embodiment of an inventive combination of a faucet assembly and a filter assembly, some parts thereof being broken away, this embodiment being illustratively shown in an installed and operative association with an exemplary (fragmentarily shown) sink.

A filter faucet combination embodiment 160 of this invention is shown in FIG. 27, where the filter assembly 159 has a threaded cap 161 which is functionally and sealingly associated with a spout arm 162. When the faucet assembly 21' is set for cold tap water diverting, and the diverted cold water is filtered through filter assembly 159, the filtered water issues from the terminal spout 164 of spout arm 162 through a channel in cap 161. Those skilled in the art will readily appreciate the minor modifications required in manifold 40, common housing structure 19 and in filter assembly 22 compared to combination 20 to accommodate the present filtered water flow path.

Figure 28:
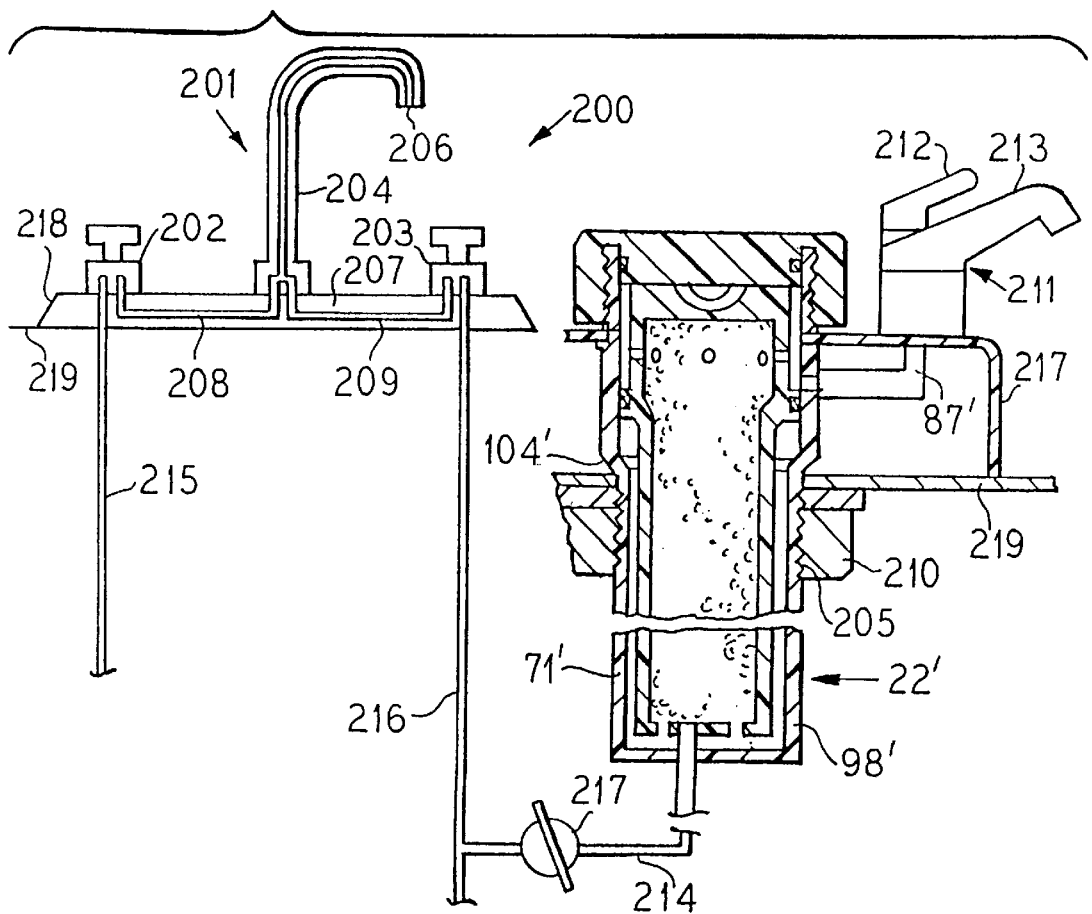
FIG. 28 is a partially schematic diagram of an alternative embodiment of a faucet and filter combination of the invention which employs an alternative filter assembly to that shown in FIGS. 21–25.

Referring to FIG. 28, there is seen a filter faucet combination 200 which incorporates a conventional kitchen-type faucet assembly 201 partially schematically shown that comprises a hand adjusted hot water valve 202, a hand adjusted cold water valve 203, a pivotable spout arm 204 having a terminal spout 206, and an interconnecting housing 207 with hot and cold tap water delivery conduits 208 and 209, respectively, connected to spout arm 204. A hot tap water supply line 215 is provided for valve 202 and a cold tap water supply line 216 is provided for valve 203.

The combination 200 also incorporates a filter assembly 22' which is similar to filter assembly 22 (detailed in FIG. 21) and which is here functionally associated with a conventional faucet 211 that is equipped with a conventional hand-actuated control arm 212 and a conventional spout 213. The filter assembly 22' is connected to a bottom-fed cold tap water supply line 214 which is T-connected to the main cold water supply line 216. Conveniently, line 214 is provided with a shut-off valve 217. However, valve 217 is normally always open so that the filter assembly 22' is always under line pressure. Valve 217 is closed when the cold water supply is to be shut-off for a filter cartridge change in filter assembly 22'. Flow of filtered water from filter assembly 22' through conduit 87' to faucet 211 is regulated by conventional operation of faucet 211. Although as shown in FIG. 28, the filter assembly 22' is provided with a shroud 217 that is separate from the shroud 218 of faucet assembly 201, the faucet assembly 201 and the filter assembly 22' may have a common shroud (not detailed), if desired, as those skilled in the art will readily appreciate. The shrouds each rest on the back deck 219 of a sink (fragmentarily shown). The outer surface of filter housing 98' is provided with circumferential threads 205 below its shoulder portion 104' for threadable engagement with retainer nut assembly 210. Tightening of retainer nut assembly 210 secures the shoulder 104' against back deck 219, and thereby securely fastens filter assembly 22', shroud 217, and faucet 211 to the sink.

Figure 29:
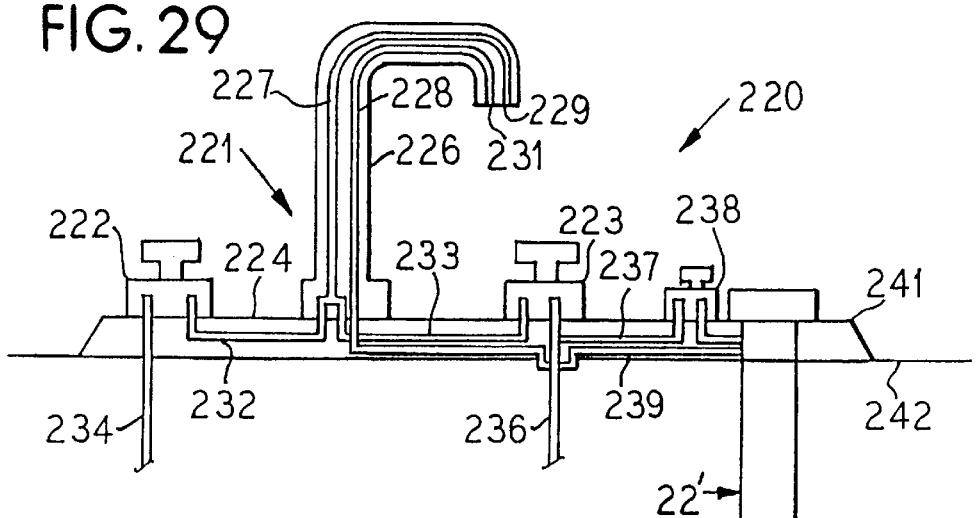
FIG. 29 is a view showing in schematic form an alternative embodiment of an inventive filter faucet combination which employs a filter assembly of FIGS. 21–25, and where the filtered water is directly output to an associated but separated spout.

Referring to FIG. 29, there is seen a filter faucet combination 220 which incorporates a conventional water mixing kitchen-type faucet assembly 221 partially schematically shown that comprises a conventional hand-adjusted hot water valve 222, a conventional hand-adjusted cold water valve 223, and an interconnecting body 224. The conventional single channel spout arm has been replaced by a spout arm 226 which has two separated longitudinally extending channels 227 and 228 defined therein with each channel having a terminal spout 229 and 231, respectively. Body 224 includes therein a conventional channel 232 interconnecting hot water valve 222 with channel 227, and a conventional channel 233 interconnecting cold water valve 223 with channel 227. A hot tap water supply line 234 is connected to valve 222 and a cold tap water supply line 236 is connected to valve 223.

The combination 220 also incorporates a filter assembly 22' which is similar to filter assembly 22 except that the cold water input and filtered water output being reversed from that shown in assembly 22. A cold water input line 237 for filter assembly 22' is T-connected to line 236. Line 237 is here provided with a conventional shut-off valve 238 (a conventional cold water valve). An output line 239 from filter assembly 22' connects with channel 228 in the spout arm 226. All conduits are preferably (and as shown) housed in a shroud 241 that includes both the faucet assembly 221 and the filter assembly 22' and that rests on the back deck 242 of a sink (not detailed). Cold filtered water from spout 231 is produced by opening valve 238. Here, the filter assembly 22' is only under line pressure when in use. All plumbing for filtration is here located in the shroud and may be considered to be part of the filter faucet combination 220. Conventional hot and cold tap water connections are utilized. In place of spout arm 226, a conventional single channel spout arm can be used.

Figure 30:
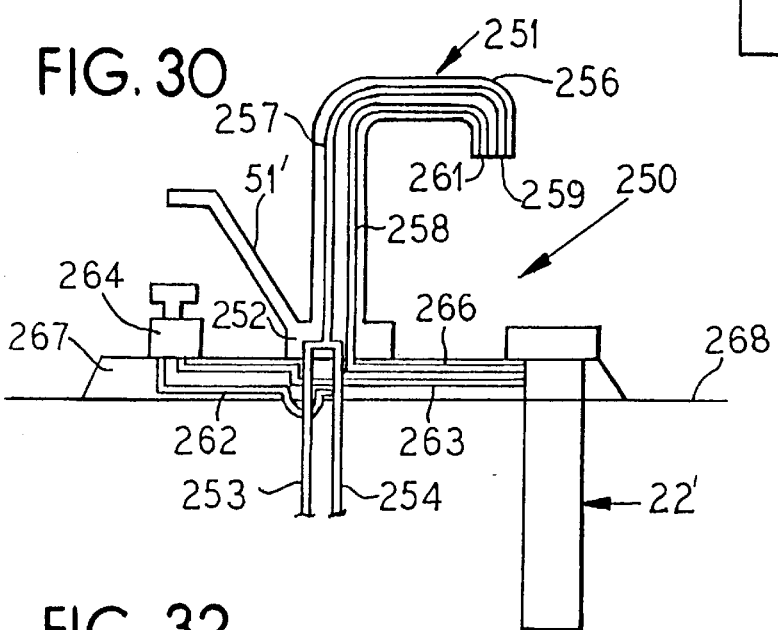
FIG. 30 is a view similar to FIG. 29, but showing another alternative inventive filter faucet combination.

Referring to FIG. 30, there is seen a filter faucet combination 250 which incorporates a conventional type of single lever kitchen-type faucet assembly 251 which has been modified. The single lever conventional faucet valve 252 (not detailed) of the faucet assembly 251 is connected to a hot tap water supply line 253 and to a cold tap water supply line 254. The conventional single channel spout arm has been replaced by a dual channel spout arm 256 having two separated longitudinally extending channels 257 and 258 defined therein with each channel having a terminal spout 259 and 261, respectively. Channel 257 receives the user-selected effluent (hot water, cold water or mixed) admitted thereto from the valve 252.

The combination 250 also incorporates a filter assembly 22' that is similar to assembly 22 with the cold water input and filtered water output being as shown in assembly 22. A cold water input line 262/263 for filter assembly 22' is T-connected to line 254. Between line portions 262 and 263, a shut-off valve 264 (a conventional cold water valve) is interconnected. An output line 266 from filter assembly 22' connects with channel 258 in spout arm 256. All conduits are housed in a single shroud 267 that includes both the faucet assembly 251 and the filter assembly 22' and that rests on the back deck 268 of a sink (not detailed). Cold filtered water from spout 261 is produced by opening valve 264. Here, filter 22' is only under line pressure when in use. As in the embodiment 220, in this embodiment 250, all plumbing for filtration is in the shroud 267 and may be considered to be part of the filter faucet combination 250. Conventional hot and cold tap water connections are utilized. In place of spout arm 256, a conventional single channel spout arm can be used, whereby lines 257 and 258 are joined, terminating in a single spout.

Referring to FIG. 31, there is filter faucet combination 270 which is similar to filter faucet combination 20, except that it is equipped with two separate valves for regulating hot, cold, admixed hot and cold, and filtered water flow. Combination 270 incorporates a conventional kitchen type faucet assembly 271 that comprises a hand adjusted hot water valve 272, a hand adjusted cold water valve 273, a pivotable spout arm 274, and an interconnecting enveloping shroud 276 which extends around and over hot water connecting conduit 277 from valve 272 to spout arm 274 and cold water connecting conduit 278 from valve 273 to spout arm 274. Spout arm 274 has two separated longitudinally extending channels 280 and 279 defined therein with each channel having a terminal spout 281 and 286, respectively. The conduits 277 and 278 each connect with channel 280. Conventional hot tap water supply line 283 connects with valve 272 and conventional cold tap water supply line 284 connects with valve 273.

The combination 270 also incorporates a filter assembly 22' that is similar to filter assembly 22 (detailed in FIG. 21) except that the cold water input and filtered water output being reversed from that shown in assembly 22.

Here the cold water valve 273 contains a conventional two-way valve (not detailed), which regulates the flow of the incoming cold water and diverts it into one of two possible paths. When this valve is turned to the filtered water position, then the cold water from line 284 is diverted to input line 69' for the filter assembly 22'. Filtered water output from filter assembly 22' feeds into line 87', and from there to line 279 and spout 286. Such a valve, for example could be similar to the cartridge 300 in FIGS. 11 and 12, but without the hot water input. Other valves that can regulate and divert water from one source into one of two channels are well known to the art. Combination 270 can, if desired, utilize a single channel spout arm.

Figure 32:
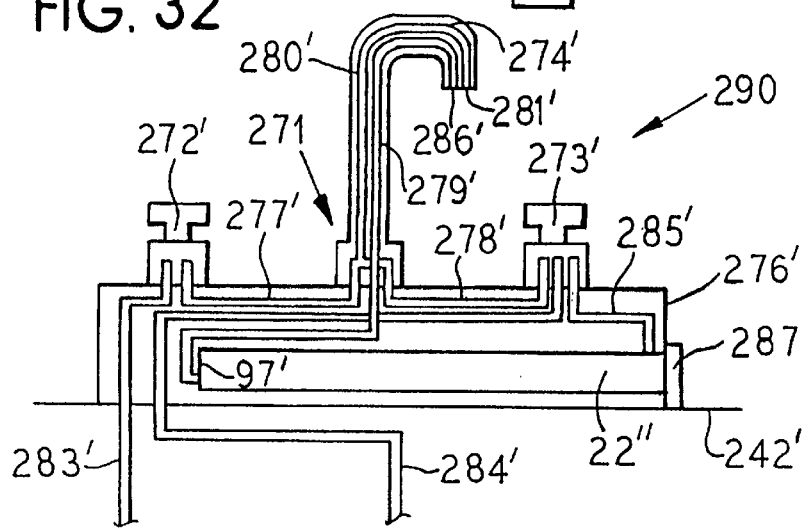
FIG. 32 is a view similar to FIG. 29 but showing another alternative inventive filter faucet combination.

Referring to FIG. 32, there is faucet and filter combination 290 which is similar to combination 270 in FIG. 31. All water line connections and valves are as in combination 270 and are labeled similarly but with the addition of prime marks.

The main difference between combination 290 and 270 is the location of the filter assembly 22" which itself is similar to assembly 22 (detailed in FIG. 21), except that the input line 285' enters the upper port while the output exits through the filter end wall 97'.

The filter assembly 22" is located completely above sink deck 242' and positioned so as to extend longitudinally and laterally entirely within the shroud 276', with only the removable cap 287 being exposed and operably positioned at one end of shroud 276'. This combination can, if desired, utilize a single lever valve and/or a single channel spout arm.

It will be understood that the invention can be embodied in other specific forms without departing from the spirit, scope and essential characteristics thereof. The present teachings are illustrative and not restrictive. The scope of the invention is indicated by the appended claims rather than by the preceding description.

What is claimed is:

1. A filter cartridge for positioning in a prechosen casing structure, said filter cartridge comprising:

an housing having elongated side walls and opposite front and back end walls and having orifices defined therein in the vicinity of each of said end walls;

sealing means locally extending continuously and circumferentially about an outside portion of said side walls in longitudinally adjacent but spaced relationship to said front end wall;

a plurality of spacer projections locally extending outwardly from outside portions of said side walls; and filtration material in said housing;

whereby, when said cartridge is fully located in said casing structure, said spacer projections maintain said housing in generally spaced relationship relative to adjacent internal surface portions of said casing structure, and said sealing means is engaged with adjacent internal surface portions of said casino structure, so that a space is generally defined between said outside portions of said side walls and said internal surface portions of said casino structure, and said space is divided into two longitudinally adjacent but separate cavities with a different one of said end walls being in each said cavity.

2. The filter cartridge of claim 1 wherein said side walls are generally cross-sectionally circular.

3. The filter cartridge of claim 1 wherein said side walls in the region thereof adjacent to said front end wall are radially enlarged and a circumferentally extending shoulder is defined in said side walls between said radially enlarged region and adjacent portions of said side walls.

4. The filter cartridge of claim 3 wherein said sealing means is located adjacent to said shoulder and said orifices that are in said vicinity of said front wall are located in said side walls between said front wall and said sealing means.

5. The filter cartridge of claim 4 wherein said spacer projections are located on said side walls in circumferentially spaced, adjacent relationship to each other at a location in longitudinally rearwardly spaced relationship relative to said shoulder.

6. The filter cartridge of claim 5 wherein said front wall has an exterior surface portion with crossbar means for association with filter cartridge extraction means whereby removal of said filter cartridge from location in said casing structure can be facilitated.

7. A filter assembly case for mounting in a receiving aperture defined in a sink back deck, and for holding therein a filter cartridge, said filter assembly case comprising in combination:
   a case housing having an elongated side wall, a lower end, and an opposed upper end having a mouth defined therein;
   said side wall adjacent to said upper end wall being radially enlarged and said side wall having a circumferentally and outwardly extending shoulder defined between said radially enlarged region and adjacent rearward portions of said side wall;
   case end cap means for closing said mouth including means for detachably connecting said end cap means with mouth adjacent portions of said side wall and also including means for sealing said end cap means relative to said mouth adjacent portions of said side wall when said end cap means is so connected to said mouth adjacent side wall portions by said means for detachably connecting;
   said end cap means being longitudinally spaced from said shoulder when said end cap means is so connected to said mouth adjacent side wall portions; and
   input and output fluid port means defined in said radially enlarged region, said input and output fluid port means being longitudinally spaced from one another and located between said shoulder and said end cap means as so connected to said mouth adjacent side wall portions;
whereby said lower end and adjacent rearward side wall portions of said case housing are extendable through a receiving aperture defined in a sink back deck to a location where said shoulder is retainable by portions of said sink back deck that are adjacent to said receiving aperture and where said input and output fluid port means and said end cap means as so connected to said mouth are above said sink back deck.

8. The filter assembly case of claim 7 wherein said side wall is generally cross-sectionally circular.

9. The filter assembly case of claim 7 wherein said end cap means includes outer circumferential portions that are adapted to overlie said mouth adjacent portions of said side wall.

10. The filter assembly case of claim 7 wherein said radially enlarged region includes a longitudinal spacing that is located between the uppermost respective one of said input and output fluid port means and said end cap means as so connected to said mouth adjacent portions of said side wall whereby said radially enlarged region in said longitudinal spacing is associatable with a shroud that extends around said radially enlarged region and through which said end cap means as so connected to said mouth adjacent portions of said side wall is extendable.

11. The filter assembly case of claim 7 wherein said means for detachably connecting said end cap means with said mouth adjacent portions of said side wall comprises matingly engagable screw thread means associated with each of said mouth adjacent portions of said side wall and outer circumferential portions of said end cap means.

12. The filter assembly case of claim 7 wherein said end cap further includes a central internal block portion that is sized to adjoin a filter cartridge front wall portion when such a filter cartridge is located in said case and when said end cap is so connected to said mouth adjacent portions of said case side wall.

13. A filter assembly for mounting through a receiving aperture defined in a sink back deck, said assembly comprising in combination a case and a coacting filter cartridge receivable within said case;
   said case comprising
      a case housing having an elongated case side wall, a case lower end wall and an opposed case upper end having a mouth defined therein;
      said case side wall adjacent to said upper end wall defining a radially enlarged region and said case side wall between said radially enlarged region and adjacent rearward case side wall portions defining a circumferentally and outwardly extending shoulder;
      case end cap means for closing said mouth and including means for detachably connecting said end cap means with mouth adjacent portions of said case side wall and also including means for sealing said end cap means relative to said mouth adjacent portions of said case side wall when said end cap means is so connected to said mouth adjacent case side wall portions by said means for detachably associating, said end cap means being longitudinally spaced from said shoulder when said end cap means is so connected to said mouth adjacent case side wall portions; and
      input and output fluid port means defined in said radially enlarged region, said input and output fluid port means being longitudinally spaced from one another and located between said shoulder and said end cap means as so connected to said mouth adjacent case side wall portions;
   whereby said lower end wall and adjacent rearward side wall portions of said case housing are extendable through a receiving aperture defined in a sink back deck to a location where said shoulder is retainable by portions of said sink back deck that are adjacent to said receiving aperture and where said input and output fluid port means and said end cap means as so connected to said mouth are above said sink back deck; and
   said filter cartridge comprising
      a filter cartridge housing having elongated cartridge side walls and opposite front and back cartridge end walls and having orifices defined therein in the vicinity of each of said cartridge end walls;
      sealing means locally extending continuously and circumferentially about an outside portion of said cartridge side walls in longitudinally adjacent but spaced relationship to said cartridge front end wall;
      a plurality of spacer projections locally extending outwardly from spaced apart outside portions of said cartridge side walls; and
      filtration material in said cartridge housing;
   the interrelationship between said case and said filter cartridge being such that, when said cartridge is fully located in said case:

(a) said spacer projections maintain said filter cartridge housing in generally spaced relationship relative to adjacent internal surface portions of said casing housing, and (b) said sealing means is engaged with adjacent internal surface portions of said casing housing at a location that circumferentially extends about said filter cartridge housing and that exists between said input port means and said output port means so that a space is generally defined between portions of said filter cartridge housing and said case housing, and said space is divided into two longitudinally adjacent but separate cavities with a different one of said filter cartridge end walls being in each said cavity and with a different one of said case fluid port means being in each said cavity;

whereby, when said filter cartridge is fully located in said case and said end cap means is so connected to said mouth adjacent case side wall portions, fluid entering said casing through one of said input and output port means moves through one of said cavities, enters said filter cartridge through said orifices defined in the vicinity of one of said cartridge housing end walls, moves longitudinally through said filter cartridge, exits said filter cartridge through said orifices defined in the vicinity of the opposite one of said cartridge housing end walls, moves through the other one of said cavities, and exits said case through the other one of said input and output port means.

14. The filter assembly of claim 13 wherein said case side wall and said cartridge side walls are each generally cross-sectionally circular.

15. The filter assembly of claim 13 wherein said case end cap means includes outer circumferential portions that are adapted to overlie said mouth adjacent portions of said case side wall.

16. The filter assembly of claim 13 wherein, in said case, said radially enlarged region includes a longitudinal spacing located between the uppermost respective one of said input and output fluid port means and said end cap means as so connected to said mouth adjacent portions of said side wall whereby said radially enlarged region in said longitudinal spacing is associatable with a shroud that extends around said radially enlarged region and through which said end cap means as so connected to said mouth adjacent portions of said case side wall is extendable.

17. The filter assembly claim 13 wherein said means for detachably connecting said end cap means with said mouth adjacent portions of said case side wall comprises matingly engagable screw thread means associated with each of said mouth adjacent portions of said case side wall and outer circumferential portions of said end cap means.

18. The filter assembly claim 13 wherein said case end cap means further includes a central internal block portion that is sized to adjoin a filter cartridge front wall portion when such a filter cartridge is located in said case and when said end cap means is so connected to said mouth adjacent portions of said case side wall.

19. The filter assembly of claim 13 wherein said cartridge side walls in the region thereof adjacent to said cartridge front end wall are radially enlarged and a circumferentally extending shoulder is defined in said cartridge side walls between said cartridge radially enlarged region and adjacent portions of said cartridge side walls.

20. The filter assembly of claim 19 wherein said sealing means is located adjacent to said cartridge shoulder and said orifices that are in said vicinity of said cartridge front wall are located in said cartridge side walls between said cartridge front wall and said sealing means.

21. The filter assembly of claim 19 wherein said spacer projections are located on said cartridge side walls in circumferentially spaced, adjacent relationship to each other at a location in longitudinally rearwardly spaced relationship relative to said cartridge shoulder that is also in radially adjacent relationship relative to said casing shoulder.

22. The filter assembly of claim 19 wherein said cartridge front wall has an exterior surface portion with crossbar means for association with a filter cartridge extraction means whereby removal of said filter cartridge from location in said case can be facilitated.

\* \* \* \* \*